US012657844B2

(12) United States Patent (10) Patent No.: US 12,657,844 B2
Ito et al. (45) Date of Patent: Jun. 16, 2026

(54) WEARABLE TERMINAL APPARATUS, PROGRAM, AND DISPLAY METHOD

(71) Applicant: KYOCERA Corporation, Kyoto (JP)

(72) Inventors: Shingo Ito, Kyoto (JP); Tomokazu Adachi, Yokohama (JP); Kai Shimizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 236 days.

(21) Appl. No.: 18/574,652

(22) PCT Filed: Jun. 28, 2021

(86) PCT No.: PCT/JP2021/024314
§ 371 (c)(1),
(2) Date: Dec. 27, 2023

(87) PCT Pub. No.: WO2023/275919
PCT Pub. Date: Jan. 5, 2023

(65) Prior Publication Data
US 2024/0296632 A1 Sep. 5, 2024

(51) Int. Cl.
G06T 19/00 (2011.01)
G06F 3/14 (2006.01)
G06T 19/20 (2011.01)

(52) U.S. Cl.
CPC .......... G06T 19/006 (2013.01); G06F 3/1454 (2013.01); G06T 19/20 (2013.01);
(Continued)

(58) Field of Classification Search
None
See application file for complete search history.

(56) References Cited

U.S. PATENT DOCUMENTS 8,914,472 B1 * 12/2014 Lee .......................... G06Q 30/04
709/219
9,503,681 B1 * 11/2016 Popescu ................ G06F 40/169
(Continued)

FOREIGN PATENT DOCUMENTS

WO 2014/162852 A1 10/2014

*Primary Examiner* — Ryan M Gray
(74) *Attorney, Agent, or Firm* — Studebaker Brackett PLLC

(57) ABSTRACT
A wearable terminal apparatus to be worn by a user for use includes at least one processor, a camera, and a communication unit. The camera images a space as a visible region of the user. The communication unit performs data communication with an external device to be used by a remote instructor. The at least one processor transmits an image obtained by the camera to the external device via the communication unit. The at least one processor receives instruction information related to an instruction to generate an instruction image via the communication unit, the instruction being made based on the image in the external device. The at least one processor causes a display unit to display the instruction image, the instruction image being visually recognized at a position based on the received instruction information in the space. The at least one processor accepts a user operation to change the displayed instruction image and updates display of the instruction image in accordance with the user operation.

18 Claims, 13 Drawing Sheets

(52) U.S. Cl.
CPC .... *G06T 2200/24* (2013.01); *G06T 2219/004* (2013.01); *G06T 2219/024* (2013.01); *G06T 2219/2012* (2013.01); *G06T 2219/2016* (2013.01); *G06T 2219/2024* (2013.01)

(56) References Cited

U.S. PATENT DOCUMENTS

| | | | |
|---|---|---|---|
| 10,235,965 B2 * | 3/2019 | Horneff | A63F 13/533 |
| 11,810,259 B2 * | 11/2023 | Ramani | G06T 19/006 |
| 2016/0054793 A1 | 2/2016 | Kasahara et al. | |
| 2016/0292925 A1 * | 10/2016 | Montgomerie | G06F 40/169 |
| 2019/0087021 A1 | 3/2019 | Balan et al. | |
| 2019/0340822 A1 | 11/2019 | Ernst et al. | |
| 2020/0273255 A1 * | 8/2020 | Godin | G09B 5/02 |
| 2020/0311397 A1 * | 10/2020 | Sawhney | G06F 3/0304 |

\* cited by examiner

Login user: A

Login user: B

*1*

*10*

*80*

*N*

EXTERNAL DEVICE

*20*

EXTERNAL DEVICE

*20*

EXTERNAL DEVICE

*20*

*80*

| | | |
|---|---|---|
| *84* OPERATION DISPLAY UNIT | | *81* CPU |
| *85* COMMUNICATION UNIT | | *82* RAM |
| | | *83* STORAGE UNIT |
| | | *831* PROGRAM |

*86*

WEARABLE TERMINAL APPARATUS, PROGRAM, AND DISPLAY METHOD

TECHNICAL FIELD

The present disclosure relates to a wearable terminal apparatus, a program, and a display method.

BACKGROUND OF INVENTION

In the related art, virtual reality (VR), mixed reality (MR), and augmented reality (AR) are known technologies that allow a user to experience a virtual image and/or a virtual space using a wearable terminal apparatus worn by the user on the head. The wearable terminal apparatus includes a display unit that covers the field of vision of the user when worn by the user. A virtual image and/or a virtual space are/is displayed on this display unit in accordance with a position and an orientation of the user. In this manner, a visual effect as if the virtual image and/or the virtual space were present is implemented (for example, U.S. Patent Application Publication No. 2019/0087021 and U.S. Patent Application Publication No. 2019/0340822).

MR is a technology that displays a virtual image as if the virtual image were present at a predetermined position in a real space while allowing a user to visually recognize the real space, to allow the user to experience mixed reality in which the real space and the virtual image are merged. VR is a technology that allows a user to visually recognize a virtual space instead of the real space in MR, to allow the user to experience as if the user were in the virtual space.

A display position of the virtual image displayed in VR and MR is determined in a space in which the user is located. When the display position is inside the visible region of the user, the virtual image is displayed on the display unit and is visually recognized by the user.

SUMMARY

In the present disclosure, a wearable terminal apparatus to be worn by a user for use includes at least one processor, a camera, and a communication unit. The camera images a space as a visible region of the user. The communication unit performs data communication with an external device to be used by a remote instructor. The at least one processor transmits an image obtained by the camera to the external device via the communication unit. The at least one processor receives instruction information related to an instruction to generate an instruction image via the communication unit, the instruction being made based on the image in the external device. The at least one processor causes a display unit to display the instruction image, the instruction image being visually recognized at a position based on the received instruction information in the space. The at least one processor accepts a user operation to change the displayed instruction image and updates display of the instruction image in accordance with the user operation.

In the present disclosure, a program causes a computer provided in a wearable terminal apparatus to perform a process. The wearable terminal apparatus is to be worn by a user for use and includes a camera to image a space as a visible region of the user and a communication unit to perform data communication with an external device to be used by a remote instructor. The process includes transmitting an image obtained by the camera to the external device via the communication unit. The process also includes receiving instruction information related to an instruction to generate an instruction image via the communication unit, the instruction being made based on the image in the external device. The process also includes causing a display unit to display the instruction image, the instruction image being visually recognized at a position based on the received instruction information in the space. The process also includes accepting a user operation to change the displayed instruction image and updating display of the instruction image in accordance with the user operation.

In the present disclosure, a display method is to be executed by a computer provided in a wearable terminal apparatus to be worn by a user for use. The wearable terminal apparatus includes a camera to image a space as a visible region of the user and a communication unit to perform data communication with an external device to be used by a remote instructor. The display method includes transmitting an image obtained by the camera to the external device via the communication unit. The display method also includes receiving instruction information related to an instruction to generate an instruction image via the communication unit, the instruction being made based on the image in the external device. The display method also includes causing a display unit to display the instruction image, the instruction image being visually recognized at a position based on the received instruction information in the space. The display method also includes accepting a user operation to change the displayed instruction image and updating display of the instruction image in accordance with the user operation.

DESCRIPTION OF EMBODIMENTS

Embodiments are described below with reference to the drawings. Note that each drawing to be referred to below illustrates in a simplified manner merely major members necessary for describing the embodiments for convenience of explanation. Therefore, a wearable terminal apparatus 10, an external device 20, and an information processing apparatus 80 according to the present disclosure may include any constituent member that is not illustrated in each drawing to be referred to.

First Embodiment

Figure 1:
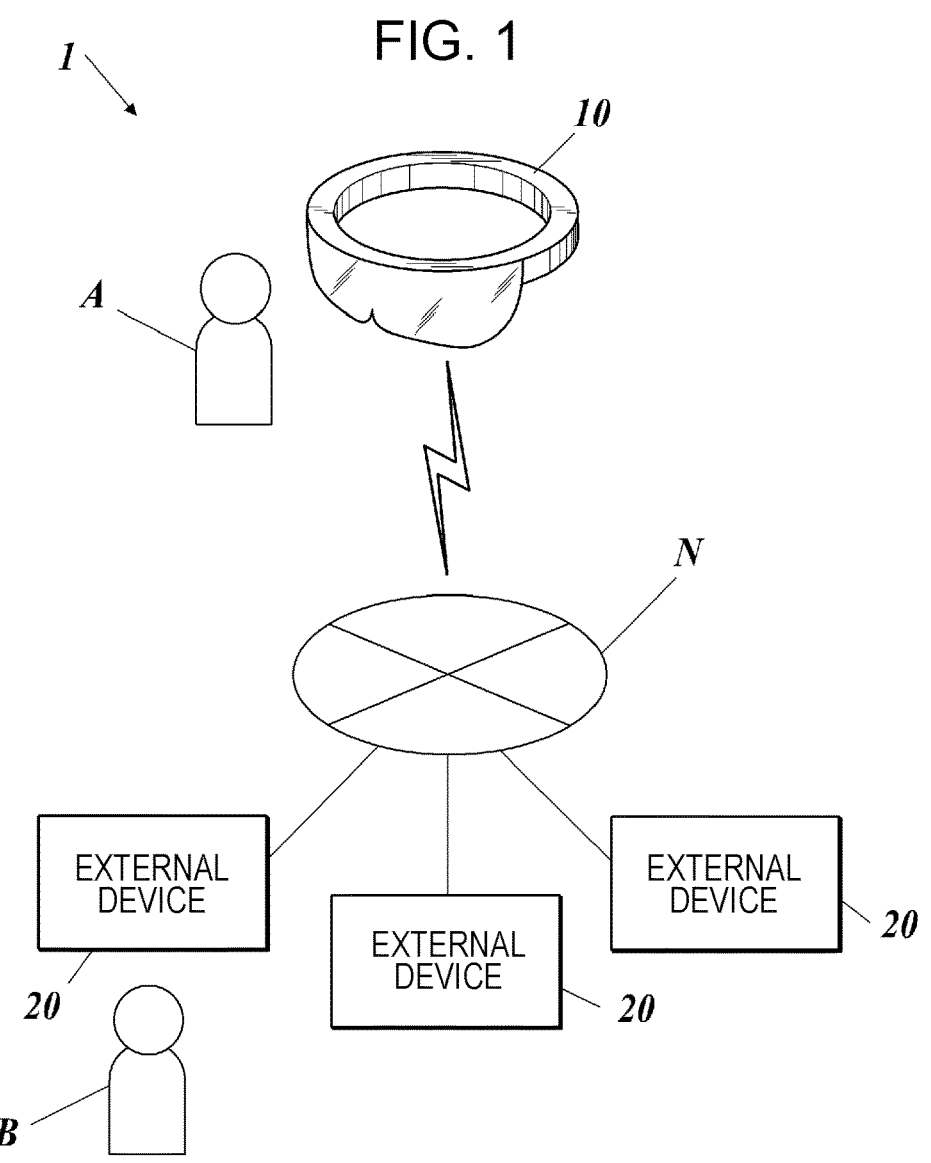
FIG. 1 is a schematic diagram illustrating a configuration of a display system according to a first embodiment.

As illustrated in FIG. 1, a display system 1 includes the wearable terminal apparatus 10 and the multiple external devices 20. The display system 1 and the external devices 20 are connected to one another by communication via a network N. The network N may be, but not limited to, the Internet, for example. Note that the display system 1 may include multiple wearable terminal apparatuses 10. The display system 1 may include a single external device 20.

The wearable terminal apparatus 10 is an apparatus that allows a user (wearer) to experience MR. In the present embodiment, a user who performs a predetermined work wears the wearable terminal apparatus 10. A remote instructor who gives an instruction to the user wearing the wearable terminal apparatus 10 from a remote place via the wearable terminal apparatus 10 operates the external device 20. The wearable terminal apparatus 10 and the external devices 20 perform a predetermined authentication operation (for example, an operation of inputting an ID and a password that are unique to a user account) to allow a login with a user account used in authentication. Through this login process, the users who operate the wearable terminal apparatus 10 and the external devices 20 are identified. An example is described below in which a user A operates the wearable terminal apparatus 10 and a remote instructor B operates one of the external devices 20.

Figure 2:
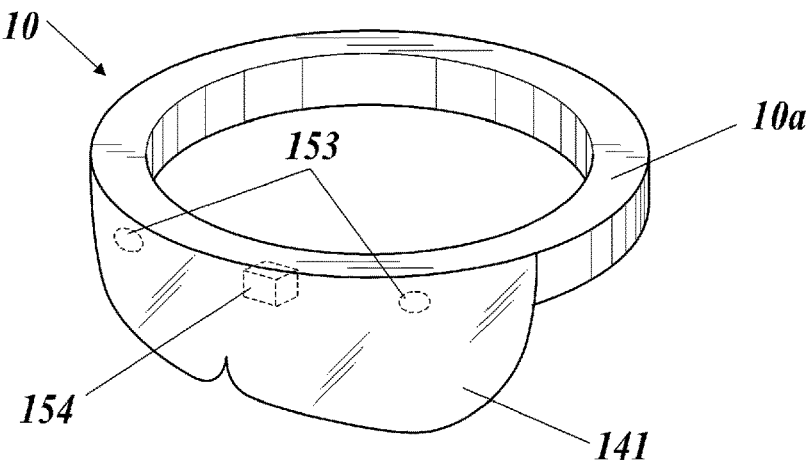
FIG. 2 is a schematic perspective view of a configuration of a wearable terminal apparatus.

As illustrated in FIG. 2, the wearable terminal apparatus 10 includes a body 10a and a visor 141 (display member) attached to the body 10a.

The body 10a is an annular member having an adjustable circumferential length. The body 10a includes various devices such as a depth sensor 153 and a camera 154 built therein. When a user wears the body 10a on the head, the visor 141 covers the field of vision of the user.

The visor 141 has a light-transmitting property. The user can visually recognize a real space through the visor 141. The body 10a includes a laser scanner 142 (see FIG. 5) therein. The laser scanner 142 projects and displays an image such as a virtual image onto a display surface of the visor 141 facing the eyes of the user. The user visually recognizes the virtual image by reflected light from the display surface. At this time, the user also visually recognizes the real space through the visor 141. Thus, a visual effect as if the virtual image were present in the real space is obtained.

Figure 3:
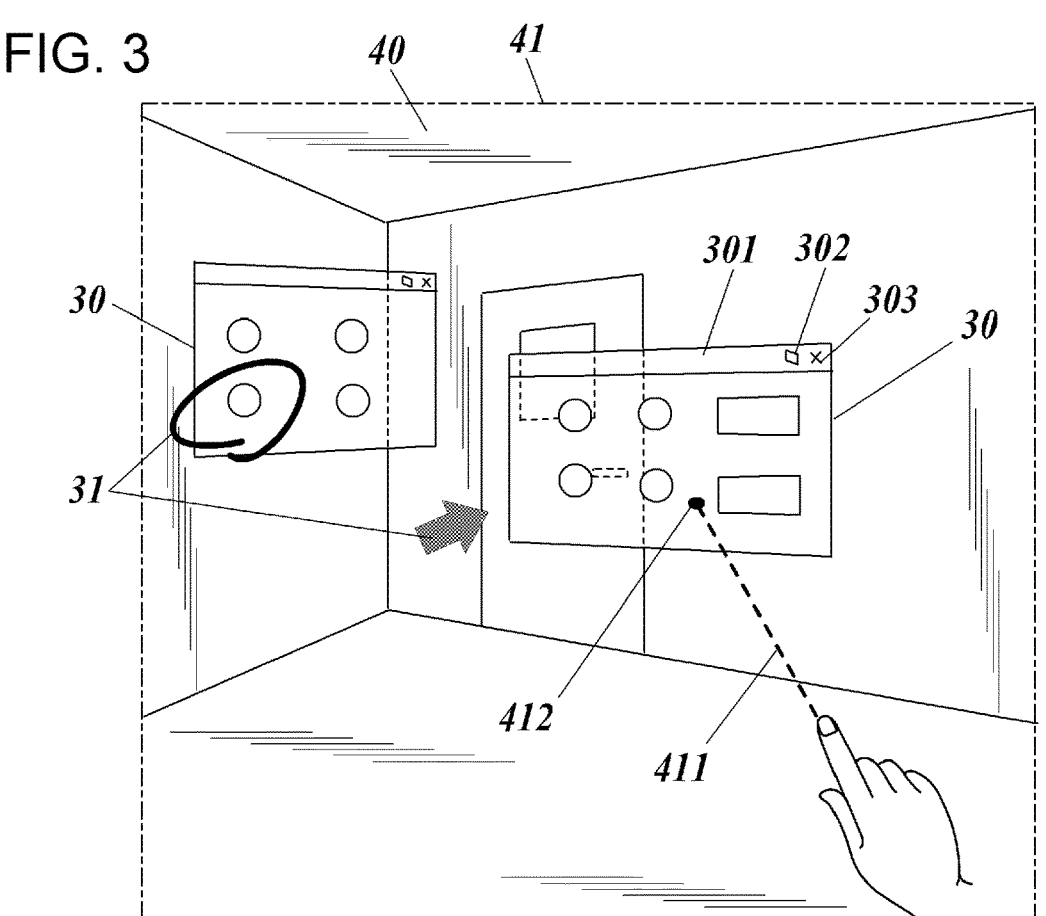
FIG. 3 is a diagram illustrating an example of a visible region and a virtual image visually recognized by a user wearing the wearable terminal apparatus.

As illustrated in FIG. 3, when a virtual image 30 is displayed, the user visually recognizes the virtual image 30 disposed toward a predetermined direction at a predetermined position in a space 40. In the present embodiment, the space 40 is the real space visually recognized by the user through the visor 141. Since the virtual image 30 is projected onto the visor 141 having a light-transmitting property, the virtual image 30 is visually recognized as a translucent image superimposed on the real space. In FIG. 3, the virtual image 30 is illustrated as a planar window screen. The virtual image 30 includes an instruction image 31 with which an instruction or description is given to the user of the wearable terminal apparatus 10. That is, the instruction image 31 is an aspect of the virtual image 30. In FIG. 3, the instruction image 31 of an arrow and the instruction image 31 of a track of a pen input are illustrated. The instruction image 31 is not limited to these and may be a document image indicating a procedure of work content. The virtual image 30 is not limited to a window screen or the instruction image 31, and may be, for example, various stereoscopic images (stereoscopic virtual objects). When the virtual image 30 is a window screen, the virtual image 30 has a front side (first surface) and a back side (second surface). Among these sides, necessary information is displayed on the front side, and no information is usually displayed on the back side.

Figure 4:
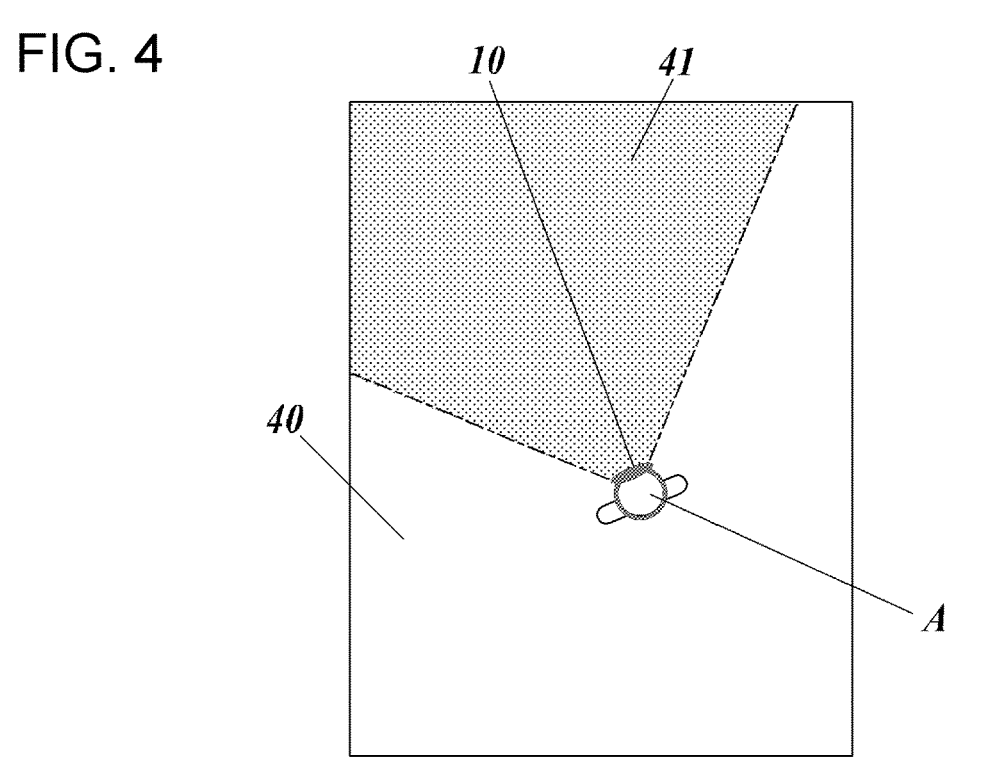
FIG. 4 is a diagram for describing the visible region in a space.

The wearable terminal apparatus 10 detects a visible region 41 of the user, based on a position and an orientation of the user in the space 40 (in other words, a position and an orientation of the wearable terminal apparatus 10). As illustrated in FIG. 4, the visible region 41 is a region located in front of the user A wearing the wearable terminal apparatus 10 in the space 40. For example, the visible region 41 is a region within a predetermined angle range in each of a left-right direction and an up-down direction with respect to the front of the user A. In this case, when a solid corresponding to the shape of the visible region 41 is cut along a plane perpendicular to the front direction of the user A, the cut surface has a quadrangular shape. Note that the shape of the visible region 41 may be determined such that the cut surface has a shape other than the quadrangular shape (such as a circular shape or elliptic shape, for example). The shape of the visible region 41 (for example, angle ranges in the left-right direction and the up-down direction with respect to the front) can be identified using a following method, for example.

The wearable terminal apparatus 10 performs field-of-view adjustment (hereinafter, referred to as calibration) in a predetermined procedure at a predetermined timing such as at the initial startup. By this calibration, a range visually recognizable by the user is identified. Thereafter, the virtual image 30 is displayed within this range. The shape of the visually recognizable range identified by this calibration can be set as the shape of the visible region 41.

The calibration is not limited to calibration performed in the predetermined procedure described above. The calibration may be automatically performed while the wearable terminal apparatus 10 performs a normal operation. For example, when there is no reaction on a display to which a reaction is to be made by the user, the wearable terminal apparatus 10 may regard the display range as being outside the range of the field of view of the user and adjust the field of view (and the shape of the visible region 41). When there is a reaction from the user on a display that is experimentally made at a position determined to be outside the range of the field of view, the wearable terminal apparatus 10 may regard the display range as being inside the range of the field of view of the user and adjust the field of view (and the shape of the visible region 41).

Note that the shape of the visible region 41 may be determined and fixed in advance at the time of shipment or the like irrespective of the adjustment result of the field of view. For example, the shape of the visible region 41 may be determined to be a maximum displayable range in terms of the optical design of a display unit 14.

In response to a predetermined user operation, the virtual image 30 is generated with a determined display position and a determined orientation in the space 40. The instruction image 31 of the virtual image 30 is generated based on instruction information 133 (see FIG. 5) transmitted from the external device 20 to the wearable terminal apparatus 10, for example. The user of the wearable terminal apparatus 10 may generate the instruction image 31 for the purpose of a reminder. The wearable terminal apparatus 10 projects and displays, onto the visor 141, the virtual image 30 whose display position is determined to be inside the visible region 41 among the generated virtual images 30. FIG. 3 illustrates the visible region 41 using a chain line.

The display position and the orientation of the virtual image 30 on the visor 141 are updated in real time in accordance with a change of the visible region 41 of the user. That is, the display position and the orientation of the virtual image 30 change in accordance with the change of the visible region 41 so that the user recognizes that "the virtual image 30 is located at the set position and in the set orientation in the space 40". For example, when the user moves from the front side to the back side of the virtual image 30, the shape (angle) of the displayed virtual image 30 gradually changes in accordance with this movement. When the user moves to the back side of the virtual image 30 and then faces toward the virtual image 30, the back side is displayed so that the back side of the virtual image 30 is visually recognized. In response to the change of the visible region 41, the virtual image 30 whose display position becomes out of the visible region 41 is no longer displayed, and if there is the virtual image 30 whose display position enters the visible region 41, the virtual image 30 is newly displayed.

As illustrated in FIG. 3, when the user stretches their hand (or finger) forward, the wearable terminal apparatus 10 detects the stretching direction of the hand, and displays a virtual line 411 extending in the direction and a pointer 412 on the display surface of the visor 141, which are visually recognized by the user. The pointer 412 is displayed at an intersection of the virtual line 411 and the virtual image 30. When the virtual line 411 does not intersect with the virtual image 30, the pointer 412 may be displayed at an intersection of the virtual line 411 with a wall surface or the like in the space 40. When a distance between the user's hand and the virtual image 30 is within a predetermined reference distance, display of the virtual line 411 may be omitted and the pointer 412 may be directly displayed at a position corresponding to the position of the fingertip of the user.

The user can adjust the direction of the virtual line 411 and the position of the pointer 412 by changing the stretching direction of the hand. The user performs a predetermined gesture after adjusting the pointer 412 to be located at a predetermined operation target (such as a function bar 301, a window shape change button 302, or a close button 303, for example) included in the virtual image 30. The wearable terminal apparatus 10 detects this gesture. Thus, the user can perform a predetermined operation on the operation target. For example, by performing a gesture (for example, a pinch gesture with fingers) of selecting an operation target with the pointer 412 placed at the close button 303, the user can close (delete) the virtual image 30. By performing the selecting gesture with the pointer 412 placed at the function bar 301 and performing a gesture of moving the hand forward, backward, leftward, and rightward in the selected state, the user can move the virtual image 30 in a depth direction and a left-right direction. The operations performed on the virtual image 30 are not limited these operations.

As described above, the wearable terminal apparatus 10 according to the present embodiment can implement a visual effect as if the virtual image 30 were present in the real space and can accept a user operation on the virtual image 30 and reflect the user operation on the display of the virtual image 30. That is, the wearable terminal apparatus 10 according to the present embodiment provides MR.

A functional configuration of the wearable terminal apparatus 10 is described with reference to FIG. 5.

The wearable terminal apparatus 10 includes a central processing unit (CPU) 11, a random access memory (RAM) 12, a storage unit 13, the display unit 14, a sensor unit 15, a communication unit 16, a microphone 17, and a speaker 18. These components are connected to one another by a bus 19. The components except for the visor 141 of the display unit 14 among the components illustrated in FIG. 5 are built in the body 10_a_ and operate by electric power supplied from a battery also built in the body 10_a_.

The CPU 11 is a processor that performs various kinds of arithmetic processing and integrally controls operations of the components of the wearable terminal apparatus 10. The CPU 11 reads and executes a program 131 stored in the storage unit 13 to perform various control operations. The CPU 11 executes the program 131 to perform a visible region detection process and a display control process, for example. Among these processes, the visible region detection process is a process of detecting the visible region 41 of the user in the space 40. The display control process is a process of causing the display unit 14 to display the virtual image 30 whose position is determined to be inside the visible region 41 among the virtual images 30 whose positions in the space 40 are determined.

Figure 5:
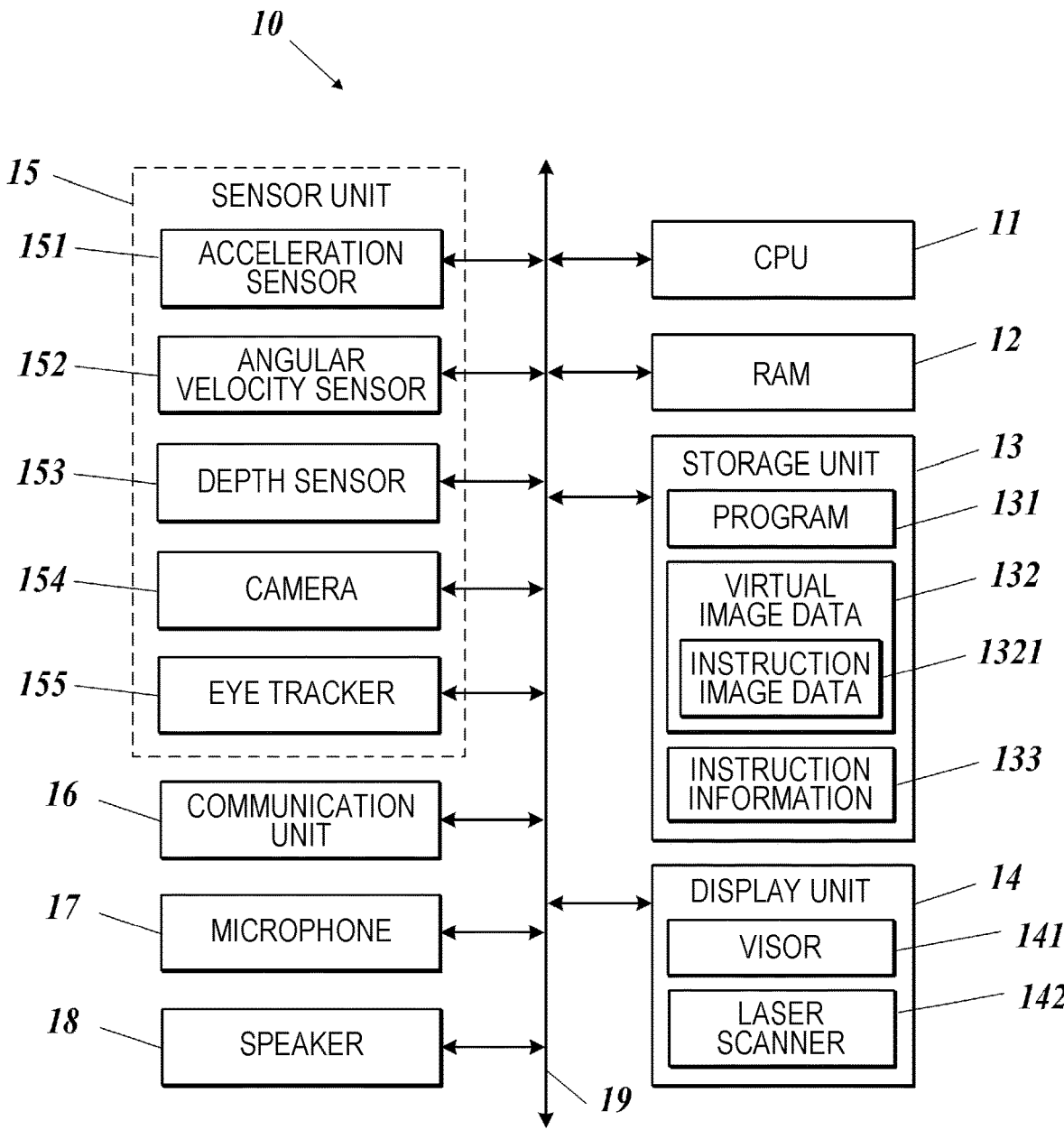
FIG. 5 is a block diagram illustrating a major functional configuration of the wearable terminal apparatus.

Although FIG. 5 illustrates a single CPU 11, the configuration is not limited to this configuration. Two or more processors such as CPUs may be provided. These two or more processors may perform in a distributed manner the processes performed by the CPU 11 in the present embodiment.

The RAM 12 provides a working memory space for the CPU 11 and stores temporary data.

The storage unit 13 is a non-transitory recording medium readable by the CPU 11 which is a computer. The storage unit 13 stores the program 131 to be executed by the CPU 11, various kinds of setting data, and so on. The program 131 is stored in the storage unit 13 in a form of a computer-readable program code. Examples of the storage unit 13 to be used include a nonvolatile storage device such as a solid state drive (SSD) including a flash memory.

Data stored in the storage unit 13 includes virtual image data 132 related to the virtual image 30 and the instruction information 133 acquired from the external device 20.

The virtual image data 132 includes data (for example, image data) related to display content of the virtual image 30, data of a display position, and data of an orientation. The virtual image data 132 also includes instruction image data 1321 (instruction image information) for displaying the instruction image 31. For example, the instruction image data 1321 for the instruction image 31 of an arrow includes data on the size, the color, the display position, and the orientation of the arrow. The instruction image data 1321 for the instruction image 31 for a track of a pen input includes the thickness, the color, the display position (including coordinates of each point of the track), and the orientation of the track. The virtual image data 132 for the instruction image 31 of a document image includes content of the document image and the size, the color, the display position, and the orientation of the window.

The instruction information 133 is data transmitted from the external device 20 to the wearable terminal apparatus 10 to display the instruction image 31 in the wearable terminal apparatus 10. The content of the instruction information 133 is not limited and may include at least information that allows the instruction image 31 for which a display instruction is given in the external device 20 to be displayed in the wearable terminal apparatus 10. For example, the instruction information 133 may include information for designating a type of the instruction image 31, such as an arrow or a track of a pen input. The instruction information 133 may include information for designating the size, the color, and the orientation of the instruction image 31. The instruction information 133 may include information that allows the display position of the instruction image 31 in the space 40 to be identified. The information that allows the display position of the instruction image 31 in the space 40 to be identified is not limited to information directly identifying the position in the space 40 and may be information representing a positional relationship with another object or the position in a two-dimensional image of the space 40. In response to receipt of the instruction information 133, the CPU 11 generates the instruction image data 1321 described above based the instruction information 133.

The display unit 14 includes the visor 141, the laser scanner 142, and an optical system that guides light output from the laser scanner 142 to the display surface of the visor 141. The laser scanner 142 irradiates the optical system with pulsed laser light, of which on and off are controlled for each pixel in accordance with a control signal from the CPU 11, while performing a scan in a predetermined direction. The laser light incident to the optical system forms a display screen that is a two-dimensional pixel matrix on the display surface of the visor 141. A to-be-used system of the laser scanner 142 may be, but not limited to, a system of performing a scan with laser light by operating a mirror by micro electro mechanical systems (MEMS), for example. The laser scanner 142 includes three light-emitting units that emit laser light of red (R), green (G), and blue (B), for example. The display unit 14 projects light from these light-emitting units onto the visor 141, and thus can implement color display.

The sensor unit 15 includes an acceleration sensor 151, an angular velocity sensor 152, the depth sensor 153, the camera 154, and an eye tracker 155. Note that the sensor unit 15 may further include a sensor not illustrated in FIG. 5.

The acceleration sensor 151 detects an acceleration and outputs a detection result to the CPU 11. A translational motion of the wearable terminal apparatus 10 in three orthogonal axial directions can be detected from the detection result obtained by the acceleration sensor 151.

The angular velocity sensor 152 (gyro sensor) detects an angular velocity and outputs a detection result to the CPU 11. A rotational motion of the wearable terminal apparatus 10 can be detected from the detection result obtained by the angular velocity sensor 152.

The depth sensor 153 is an infrared camera that detects a distance to a subject by a time of flight (ToF) method, and outputs a detection result of the distance to the CPU 11. The depth sensor 153 is provided on the front surface of the body 10a to be able to image the visible region 41. Each time the position and the orientation of the user change in the space 40, the depth sensor 153 repeatedly performs measurement. By combining the results, three-dimensional mapping of the entire space 40 can be performed (that is, a three-dimensional structure can be acquired).

The camera 154 images the space 40 with a group of RGB imaging elements, acquires color image data as an imaging result, and outputs the color image data to the CPU 11. The camera 154 is provided on the front surface of the body 10a to be able to image the visible region 41. The output image from the camera 154 is used to detect the position, the orientation, and the like of the wearable terminal apparatus 10. The output image is also transmitted from the communication unit 16 to the external device 20 and is used to display the visible region 41 of the user of the wearable terminal apparatus 10 on the external device 20.

The eye tracker 155 detects the line of sight of the user and outputs a detection result to the CPU 11. The method of detecting the line of sight to be used may be, but not limited to, a method in which reflection points of near-infrared light in the eyes of the user are imaged by an eye tracking camera and the imaging result and an image obtained by the camera 154 are analyzed to identify the target visually recognized by the user, for example. A part of the configuration of the eye tracker 155 may be provided in a peripheral portion or the like of the visor 141.

The communication unit 16 is a communication module including an antenna, a modulation/demodulation circuit, and a signal processing circuit. The communication unit 16 transmits and receives data to and from the external device 20 by wireless communication in accordance with a predetermined communication protocol. The communication unit 16 can perform audio data communication with the external device 20. That is, the communication unit 16 transmits audio data collected by the microphone 17 to the external device 20, and receives audio data transmitted from the external device 20 to output sound from the speaker 18.

The microphone 17 converts sound such as voice of the user into an electric signal and outputs the electric signal to the CPU 11.

The speaker 18 converts the input audio data into mechanical vibrations and output the vibrations as sound.

In the wearable terminal apparatus 10 thus configured, the CPU 11 performs control operations below.

The CPU 11 performs three-dimensional mapping of the space 40, based on the distance data to the subject input from the depth sensor 153. The CPU 11 repeatedly performs this three-dimensional mapping each time the position and the orientation of the user change, and updates the result each time. The CPU 11 performs three-dimensional mapping in units of the continuous space 40. Thus, when the user moves between multiple rooms partitioned by a wall or the like, the CPU 11 recognizes each room as one space 40 and performs three-dimensional mapping separately for each room.

The CPU 11 detects the visible region 41 of the user in the space 40. Specifically, the CPU 11 identifies the position and the orientation of the user (the wearable terminal apparatus 10) in the space 40, based on the detection results obtained by the acceleration sensor 151, the angular velocity sensor 152, the depth sensor 153, the camera 154, and the eye tracker 155 and the accumulated three-dimensional mapping results. The CPU 11 then detects (identifies) the visible region 41, based on the identified position and the orientation and the predetermined shape of the visible region 41.

The CPU 11 continuously detects the position and the orientation of the user in real time, and updates the visible region 41 in conjunction with the change in the position and the orientation of the user. Note that the visible region 41 may be detected using the detection results of some of the acceleration sensor 151, the angular velocity sensor 152, the depth sensor 153, the camera 154, and the eye tracker 155.

The CPU 11 generates the virtual image data 132 related to the virtual image 30 in response to a user operation. That is, in response to detecting a predetermined operation (gesture) for instructing generation of the virtual image 30, the CPU 11 identifies the display content (for example, image data), the display position, and the orientation of the virtual image, and generates the virtual image data 132 including date representing these identified results.

Based on the virtual image data 132, the CPU 11 causes the display unit 14 to display the virtual image 30 whose display position is determined to be inside the visible region 41. When the virtual image data 132 includes the instruction image data 1321, the CPU 11 causes the display unit 14 to display the instruction image 31 whose display position is determined to be inside the visible region 41. Specifically, the CPU 11 identifies the display position of the virtual image 30 based on the virtual image data 132, and identifies the display position of the instruction image 31 based on the instruction image data 1321. Based on the visible region 41 at that time point and a positional relationship with the identified display positions, the CPU 11 generates image data of a display screen to be displayed on the display unit 14 such that the virtual image 30 and/or the instruction image 31 are visually recognized at the respective display positions. The CPU 11 causes the laser scanner 142 to perform a scan operation based on this image data to form the display screen including the virtual image 30 and/or the instruction image 31 on the display surface of the visor 141. That is, the CPU 11 causes the virtual image 30 and/or the instruction image 31 to be displayed on the display surface of the visor 141 such that the virtual image 30 and/or the instruction image 31 are visually recognized in the space 40 that is visually recognized through the visor 141. By continuously performing this display control process, the CPU 11 updates the display content on the display unit 14 in real time in accordance with the movement of the user (change in the visible region 41). When a setting is made to hold the virtual image data 132 and the instruction image data 1321 even in a power-off state of the wearable terminal apparatus 10, the existing virtual image data 132 and the instruction image data 1321 are read in response to the next startup of the wearable terminal apparatus 10. If the virtual image 30 and/or the instruction image 31 located inside the visible region 41 are present, the virtual image 30 and/or the instruction image 31 are displayed on the display unit 14.

The CPU 11 detects the position and the orientation of the user's hand (and/or finger) based on the images obtained by the depth sensor 153 and the camera 154, and causes the display unit 14 to display the virtual line 411 extending in the detected direction and the pointer 412. The CPU 11 detects a gesture of the user's hand (and/or finger) based on the images obtained by the depth sensor 153 and the camera 154, and performs a process in accordance with the content of the detected gesture and the position of the pointer 412 at that time point.

Figure 6:
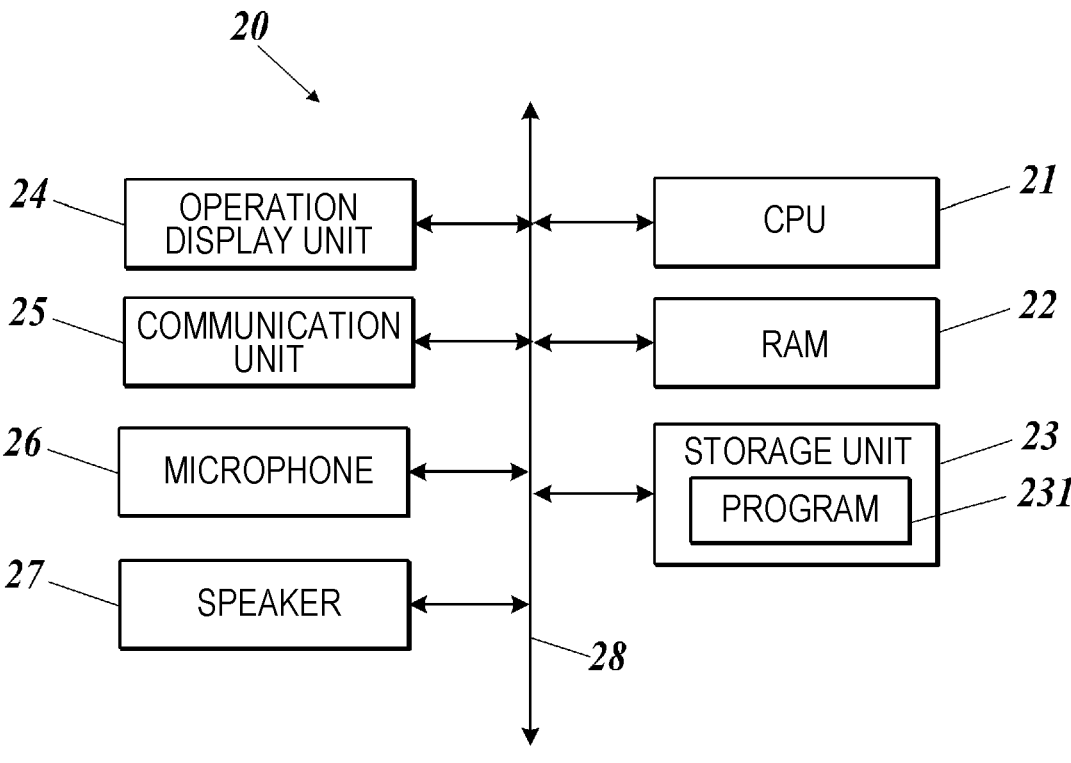
FIG. 6 is a block diagram illustrating a major functional configuration of an external device.

A functional configuration of the external device 20 is described with reference to FIG. 6.

The external device 20 includes a CPU 21, a RAM 22, a storage unit 23, an operation display unit 24, a communication unit 25, a microphone 26, and a speaker 27. These components are connected to one another by a bus 28.

The CPU 21 is a processor that performs various kinds of arithmetic processing and integrally controls operations of the components of the external device 20. The CPU 21 reads and executes a program 231 stored in the storage unit 23 to perform various control operations.

The RAM 22 provides a working memory space for the CPU 21 and stores temporary data.

The storage unit 23 is a non-transitory recording medium readable by the CPU 21 which is a computer. Examples of the storage unit 23 to be used include a nonvolatile storage device such as a solid state drive (SSD) including a flash memory or a hard disk drive (HDD). The storage unit 23 stores the program 231 to be executed by the CPU 21, various kinds of setting data, and so on. The program 231 is stored in the storage unit 23 in a form of a computer-readable program code.

The operation display unit 24 includes a display device such as a liquid crystal display and an input device such as a mouse and keyboard. The operation display unit 24 performs various displays such as an operation status and a processing result of the display system 1 on the display device. The displays include, for example, an instructor screen 241 including an image of the visible region 41 imaged by the camera 154 of the wearable terminal apparatus 10. Content of the instructor screen 241 is described in detail below. The operation display unit 24 converts a user's input operation on the input device into an operation signal and outputs the operation signal to the CPU 21.

The communication unit 25 transmits and receives data to and from the wearable terminal apparatus 10 in accordance with a predetermined communication protocol. The communication unit 25 can perform audio data communication with the wearable terminal apparatus 10. That is, the communication unit 25 transmits audio data collected by the microphone 26 to the wearable terminal apparatus 10, and receives audio data transmitted from the wearable terminal apparatus 10 to output sound from the speaker 27. The communication unit 25 may be capable of communicating with an apparatus other than the wearable terminal apparatus 10.

The microphone 26 converts sound such as voice of the remote instructor into an electric signal and outputs the electric signal to the CPU 21.

The speaker 27 converts the input audio data into mechanical vibrations and output the vibrations as sound.

An operation of the display system 1 is described.

In the display system 1 according to the present embodiment, the wearable terminal apparatus 10 performs bidirectional data communication with the one or two or more external devices 20 to be able to share various kinds of data and perform collaborative work. For example, data of an image (obtained image) obtained by the camera 154 of the wearable terminal apparatus 10 is transmitted to the external device 20 and is displayed as the instructor screen 241 on the operation display unit 24, so that the remote instructor B can recognize in real time what is viewed by the user A of the wearable terminal apparatus 10. Sound collected by the microphone 17 of the wearable terminal apparatus 10 and sound collected by the microphone 26 of the external device 20 are transmitted by real-time bidirectional audio data communication, so that a voice call can be performed. Thus, a period in which the wearable terminal apparatus 10 and the external device 20 perform audio data communication includes a period in which the user A of the wearable terminal apparatus 10 and the remote instructor B are having a voice call. Communication including at least one of real-time audio data communication between the wearable terminal apparatus 10 and the external device 20 and real-time obtained image transmission from the wearable terminal apparatus 10 to the external device 20 is hereinafter referred to as "live communication". During live communication, the remote instructor B can give an instruction or assistance to the user of the wearable terminal apparatus 10 via a voice call while viewing a real-time camera image. Note that three or more persons including the user A of the wearable terminal apparatus 10 and two or more remote instructors who operate two or more external devices 20 may perform live communication.

The remote instructor B who operates the external device 20 performs a predetermined operation while viewing the instructor screen 241 in which the image obtained by the camera 154 of the wearable terminal apparatus 10 is displayed, to be able to display the instruction image 31 at a desired position in the instructor screen 241. In response to the above operation of the remote instructor B, the CPU 21 of the external device 20 generates the instruction information 133 for causing the wearable terminal apparatus 10 to display the instruction image 31, and transmits the instruction information 133 to the wearable terminal apparatus 10. Upon receiving this instruction information 133, the wearable terminal apparatus 10 displays the instruction image 31 at a position in the space 40 corresponding to the display position of the instruction image 31 in the instructor screen 241 in accordance with content of the instruction information 133. Thus, the user A of the wearable terminal apparatus 10 can visually recognize, in the visible region 41, the instruction image 31 generated by the remote instructor B using the external device 20. To display such an instruction image 31, the CPU 11 of the wearable terminal apparatus 10 performs control below. Specifically, the CPU 11 transmits an image obtained by the camera 154 to the external device 20 via the communication unit 16. The CPU 11 receives, via the communication unit 16, the instruction information 133 related to an instruction to generate the instruction image 31 that is given based on the image in the external device 20. The CPU 11 causes the display unit 14 to display the instruction image 31 to be visually recognized at a position based on the received instruction information 133 in the space 40. This allows the remote instructor B to display the instruction image 31 of an arrow at a desired position in the visible region 41 of the user A who is wearing the wearable terminal apparatus 10 and give an instruction on the position of the work target to the user A during live communication, for example.

In the related art, when the instruction image 31 is displayed in the wearable terminal apparatus 10 in response to an instruction from the external device 20, the instruction image 31 is not to be changed by an operation in the wearable terminal apparatus 10. The change of the instruction image 31 includes, for example, a change of the display position, the color, the shape, the orientation, or the size of the instruction image 31 and addition of an annotation or various indicators. The change of the color of the instruction image 31 includes a change of the color of a prat of the instruction image 31.

However, the user A wearing the wearable terminal apparatus 10 may feel wrong about the position or orientation of the instruction image 31 displayed in the wearable terminal apparatus 10. The user A may also desire to add an annotation to the instruction image 31 as a reminder for the user A, a message for another user, or the like. In such cases, not permitting the change of the instruction image 31 in response to an operation on the wearable terminal apparatus 10 is inconvenient for the user A of the wearable terminal apparatus 10 and serves as a cause of the reduced work efficiency or hindrance to smooth communication with the remote instructor.

In contrast, the wearable terminal apparatus 10 according to the present disclosure permits the change of the instruction image 31 displayed in accordance with an instruction from the external device 20. That is, the CPU 11 of the wearable terminal apparatus 10 accepts a user operation to change the instruction image 31 displayed on the display unit 14, and updates display of the instruction image 31 in response to the user operation. Operations related to such display and change of the instruction image 31 are described below with reference to FIGS. 7 to 16.

Figure 7:
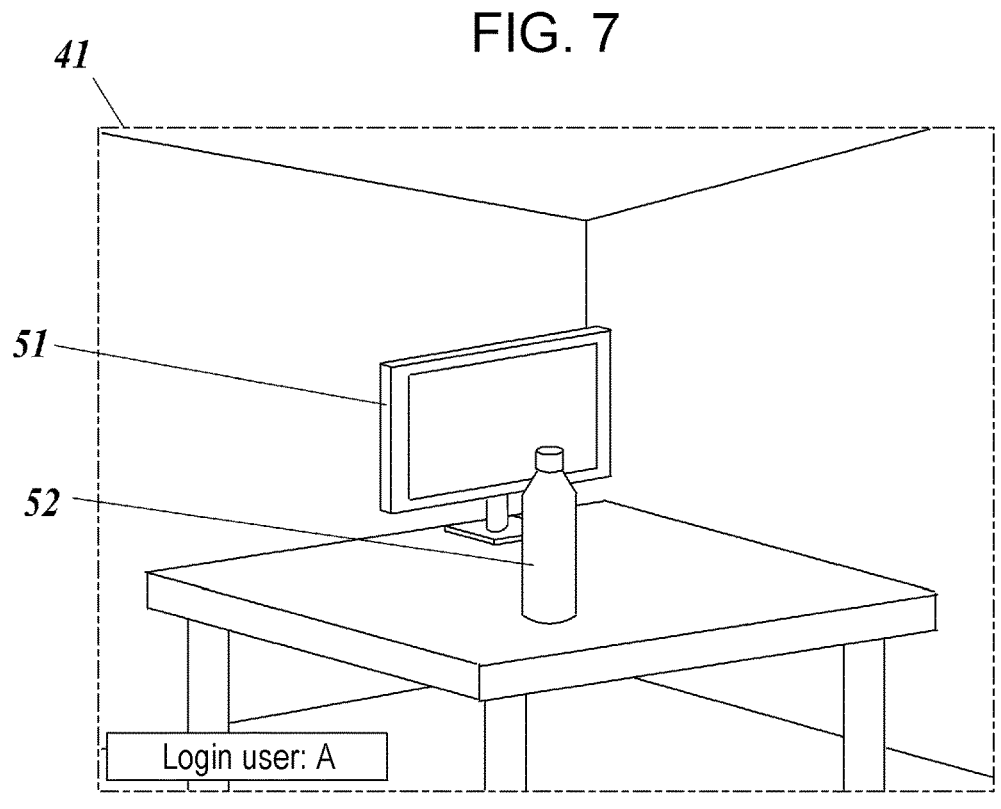
FIG. 7 is a diagram illustrating a visible region of a user of the wearable terminal apparatus.

FIG. 7 illustrates the visible region 41 of the user A of the wearable terminal apparatus 10 at a certain time point. Description is given of an example in which a monitor 51 and a drink bottle 52 are included in the visible region 41. The monitor 51 is mounted on a table, and the bottle 52 is placed in front of the monitor 51 (a position closer to the wearable terminal apparatus 10) on the table. FIG. 7 indicates that the user A of the wearable terminal apparatus 10 has logged in. However, this is for convenience of explanation, and this display may be omitted in the actual visible region 41.

Figure 8:
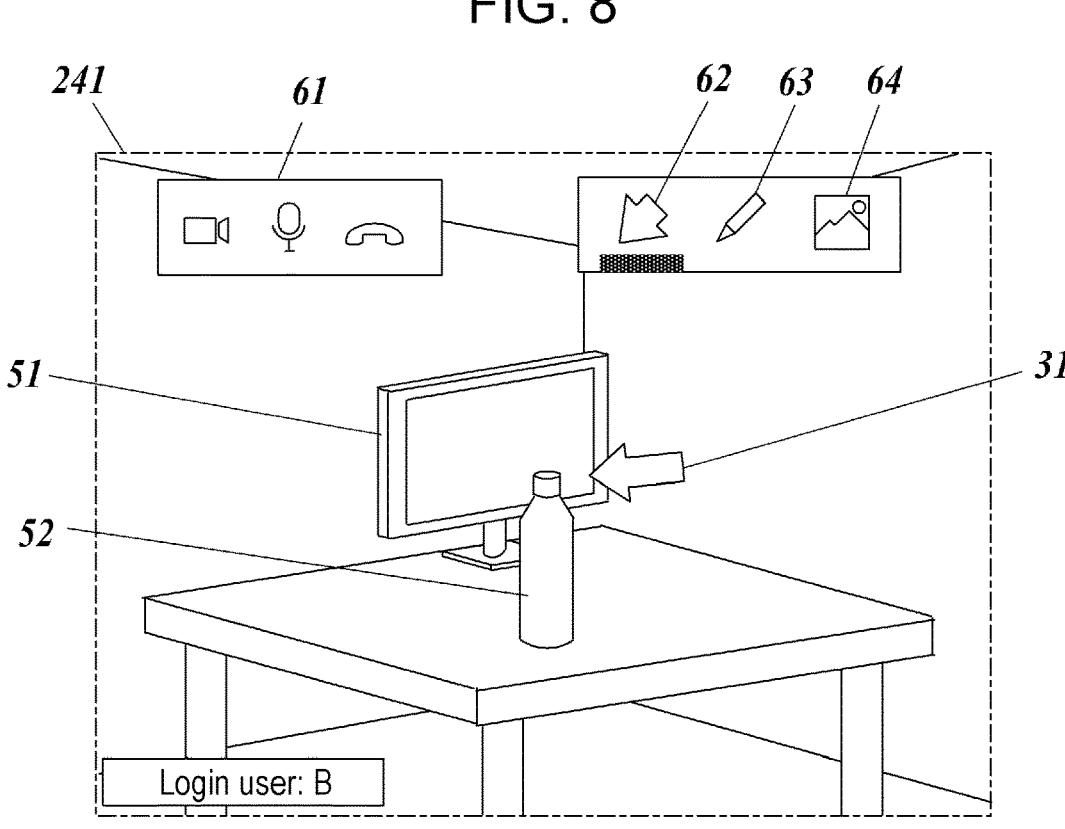
FIG. 8 is a diagram illustrating a state in which an instruction image is displayed in an instructor screen of the external device.

FIG. 8 illustrates the instructor screen 241 displayed on the operation display unit 24 at the same timing as that of FIG. 7 in the external device 20 that is performing live communication with the wearable terminal apparatus 10. The instructor screen 241 displays the image obtained by the camera 154 and transmitted from the wearable terminal apparatus 10 in real time. Thus, the instructor screen 241 displays the monitor 51 and the bottle 52 on the table. FIG. 8 indicates that the user B of the external device 20 has logged in. However, this is for convenience of explanation, and this display may be omitted in the actual instructor screen 241. In an upper portion of the instructor screen 241, a setting panel 61 for performing various settings of live communication, and an arrow icon 62, a pen input icon 63, and an image icon 64 that are used to give an instruction to display the instruction image 31 are displayed. The arrow icon 62 is selected to display the instruction image 31 of an arrow. The pen input icon 63 is selected to display the instruction image 31 of a track of a pen input. The image icon 64 is selected to display the instruction image 31 of a document image.

For example, in response to an instruction operation to instruct the position on the instructor screen 241 being performed with the arrow icon 62 being selected as illustrated in FIG. 8, the CPU 21 of the external device 20 causes the instruction image 31 of an arrow to be displayed at the instructed position in the instructor screen 241. In the example of FIG. 8, the remote instructor B gives an instruction to display the instruction image 31 of an arrow to point the right end portion of the monitor 51. In response to the instruction operation above, the CPU 21 generates the instruction information 133 for causing the instruction image 31 to be displayed in the wearable terminal apparatus 10 and transmits the instruction information 133 to the wearable terminal apparatus 10. The instruction information 133 includes, for example, information designating a type (arrow in this case) of the instruction image 31, information designating the size, the color, the orientation, and the like of the instruction image 31, and information that allows identification of the display position of the instruction image 31 in the space. The information that allows identification of the display position of the instruction image 31 is information indicating the position of the instruction image 31 (the position of the tip of the arrow) in the two-dimensional image obtained by the camera 154 and displayed in the instructor screen 241. The instruction information 133 may include data of the image obtained the camera 154 and received from the wearable terminal apparatus 10, and the position of the instruction image 31 may be indicated by coordinates in the image.

Figure 9:
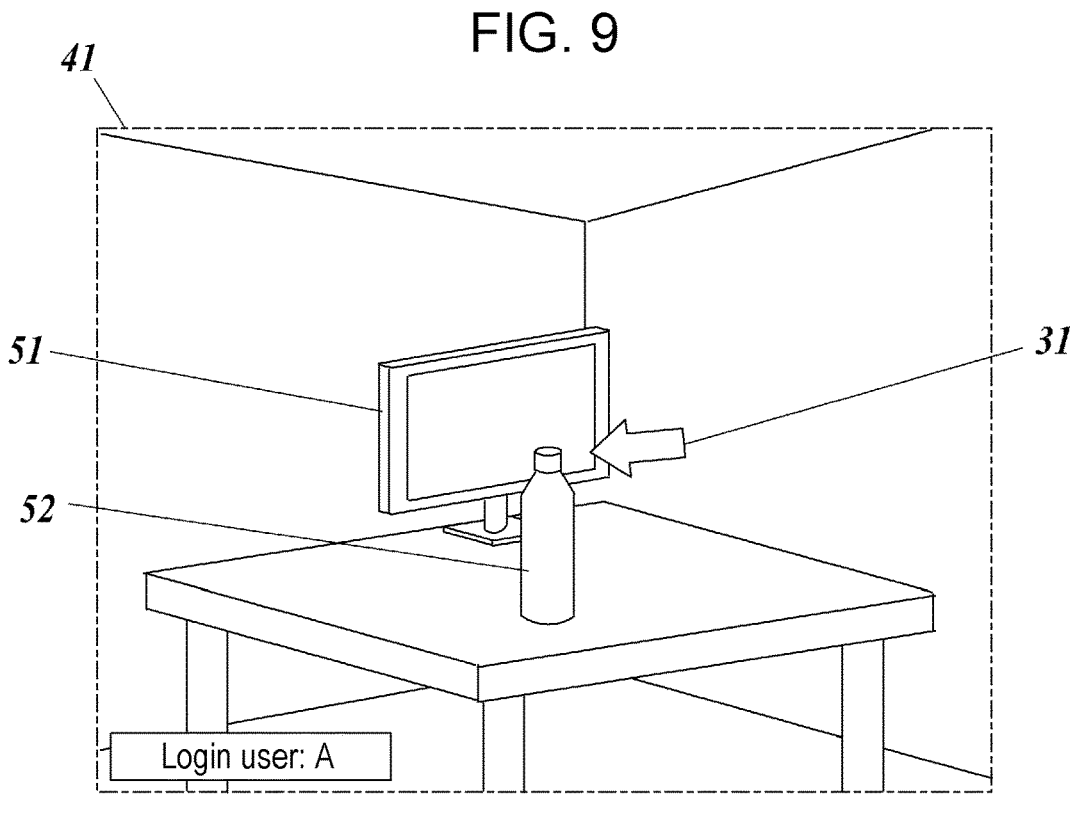
FIG. 9 is a diagram illustrating a state in which display of the instruction image is reflected in the visible region of the user of the wearable terminal apparatus.

Upon receiving the instruction information 133, the CPU 11 of the wearable terminal apparatus 10 causes the display unit 14 to display the instruction image 31 so that the instruction image 31 is visually recognized at the position based on the instruction information 133 in the space as illustrated in FIG. 9. Specifically, the CPU 11 identifies the display position of the instruction image 31 in the space, based on the received instruction information 133, and generates the instruction image data 1321 including information on the display position. The CPU 11 then causes the display unit 14 to display the instruction image 31 based on the instruction image data 1321. Examples of the to-be-used method of identifying the display position of the instruction image 31 in the space based on the instruction information 133 may include, but not limited to, a first method or a second method below.

<First Method>

In the first method, the CPU 11 acquires, from the instruction information 133, position information of the instruction image 31 (position information of the tip of the arrow) in the two-dimensional image. Based on this position information, the CPU 11 identifies the display position on an XY plane (hereinafter, referred to as "XY-plane display position") equivalent to the image in the space. The CPU 11 also sets the position of the instruction image 31 in a Z direction (depth direction) perpendicular to the XY plane at a position of an object which a line segment extending from the XY-plane display position in the Z direction first hits. A three-dimensional arrangement of an object in the space can be identified from a three-dimensional map generated based on a measurement result of the depth sensor 153. In the examples of FIGS. 8 and 9, the XY-plane display position of the instruction image 31 is the position of the tip of the arrow of the instruction image 31, that is, the position of the right end portion of the monitor 51 in the two-dimensional image in FIG. 8. In the space illustrated in FIG. 9, an object which the line segment extending from the XY-plane display position in the depth direction first hits is the monitor 51. Thus, the position of the instruction image 31 in the Z direction is identified to be the position of the monitor 51.

<Second Method>

In the second method, the CPU 11 acquires, from the instruction information 133, position information of the instruction image 31 (position information of the tip of the arrow) in the two-dimensional image as in the first method. The CPU 11 detects, from the two-dimensional image included in the instruction information 133, a feature of each object included in the image, and identifies, as an instruction target, an object located at a position closest to the position of the designated instruction image 31. For example, in the example illustrated in FIG. 8, the tip of the arrow of the instruction image 31 overlaps the monitor 51, the CPU 11 identifies the monitor 51 as the instruction target. The CPU 11 identifies the position of the object that is the instruction target in the real space, and sets the position of the instruction image 31 in the Z direction (depth direction) to match the position of the object (the monitor 51 in the example of FIGS. 8 and 9) that is the instruction target. Note that the CPU 21 of the external device 20 may identify the instruction target object in the instructor screen 241, and record the information indicating the instruction target object in the instruction information 133. In this case, the instruction target object may be identified based on image data by the CPU 21 or based on an operation to designate an object by the remote instructor B.

Note that in either the first method or the second method, the CPU 21 of the external device 20 may perform the processing performed by the CPU 11 of the wearable terminal apparatus 10. That is, the CPU 21 of the external device 20 may identify the display position of the instruction image 31 in the space. In this case, the CPU 21 of the external device 20 may acquire information (for example, a three-dimensional map) necessary to identify the position from the wearable terminal apparatus 10.

In the first method described above, the position of the instruction image 31 in the depth direction may shift from the position desired by the remote instructor B when the latest structure of the space is not reflected in the three-dimensional map or when the three-dimensional map has a low accuracy. In the second method, the position of the instruction image 31 may shift from the position desired by the remote instructor B when the instruction target object is not appropriately identified.

Figure 10:
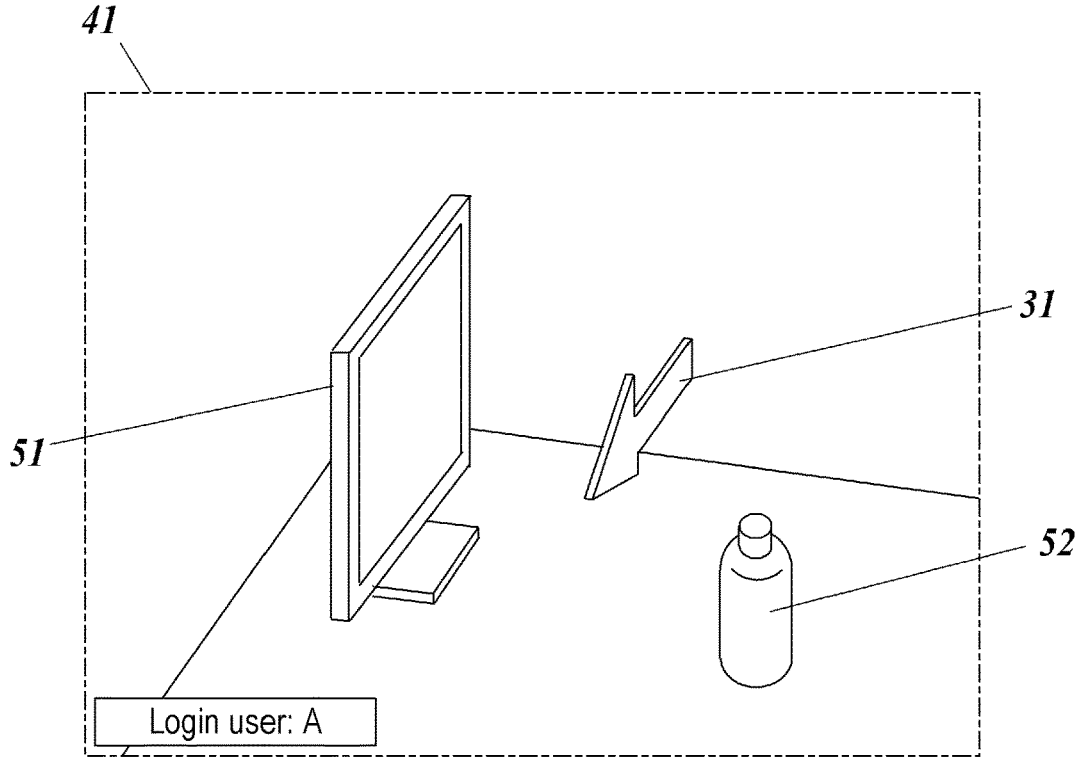
FIG. 10 is a diagram illustrating the visible region when the instruction image is viewed from another angle.

Thus, for example, even though the remote instructor B performs an operation to display the instruction image 31 at the position of the monitor 51 as illustrated in FIGS. 8 and 9, the instruction image 31 may be apart from the monitor 51 when the user A views the instruction image 31 at an angle different from that in FIG. 9 as illustrated in FIG. 10. In the state of FIG. 10, it is unclear which of the monitor 51 or the bottle 52 the instruction image 31 is pointing. In such a case, the user A of the wearable terminal apparatus 10 can perform a predetermined operation to change the position of the instruction image 31.

Figure 11:
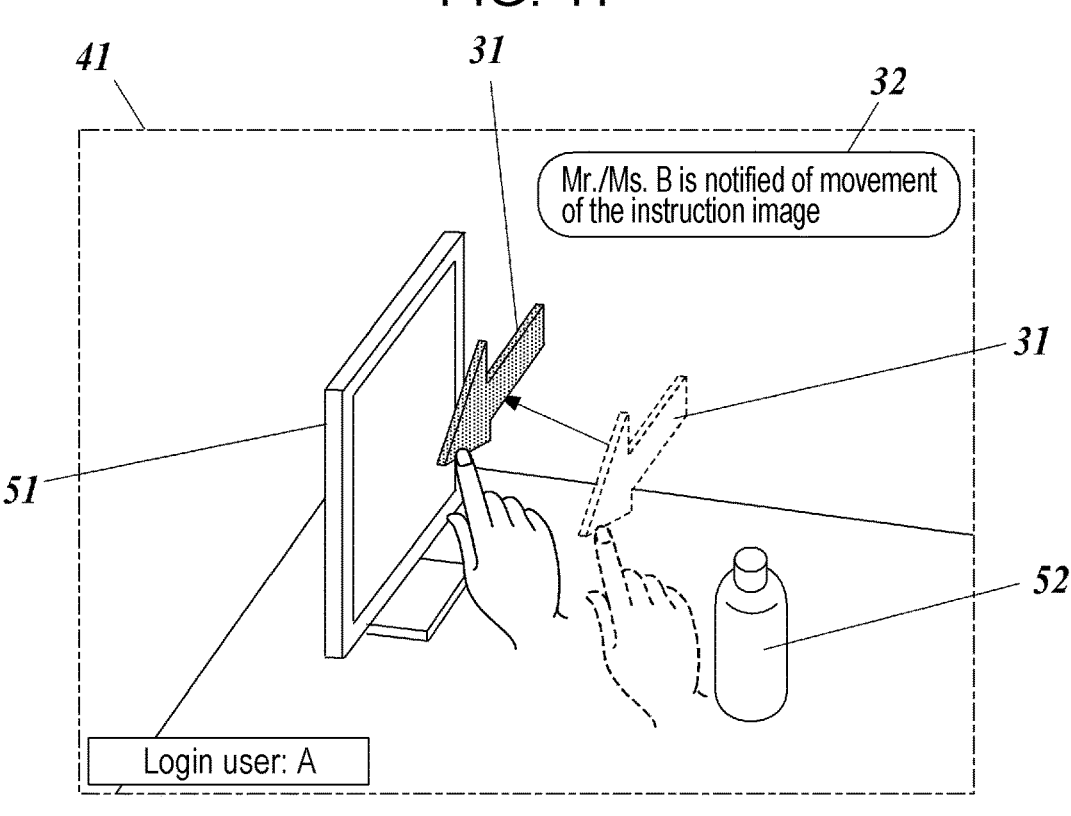
FIG. 11 is a diagram illustrating an example of a method of changing a display position of the instruction image.

FIG. 11 is a diagram illustrating an example of a method of changing the position of the instruction image 31. As illustrated in FIG. 11, the user A can perform a predetermined gesture operation to move the instruction image 31 and change the display position of the instruction image 31 in the space. As described above, the change of the instruction image 31 includes a change of the display position of the instruction image 31. The gesture operation above may be, for example, an operation of moving a hand with a portion of the instruction image 31 pinched by fingers (or selected with the pointer 412). In response to the gesture operation, the CPU 11 changes information on the display position of the instruction image 31 in the instruction image data 1321, and updates the display of (re-displays) the instruction image 31 based on the instruction image data 1321 after the change. This display update operation is performed repeatedly while the user A is moving the hand, so that a visual effect that the instruction image 31 moves to follow the motion of the hand of the user A can be implemented.

The CPU 11 may display at least one of the instruction image 31 that is being moved to the changed display position in accordance with the change of the display position or the instruction image 31 for which the change of the display position is completed, in a display style different from a display style of the instruction image 31 before the change of the display position. For example, as illustrated in FIG. 11, the color of the instruction image 31 for which the change of the display position is completed may be different from the color of the instruction image 31 before the change. That is, the change of the instruction image 31 may include a change of the color of the instruction image 31. This can indicates that the display position of the instruction image 31 is changed in response to an operation of the user A in a visually easy-to-understand manner. Note that the display style that is changed is not limited to the color. An outline of the instruction image 31 may be emphasized, or the instruction image 31 may be caused to flicker.

Various changes such as the change of the display position of the instruction image 31 may be performed upon a permission of the remote instructor B who operates the external device 20. Thus, in response to a user operation to change the instruction image 31, the CPU 11 may transmit a request signal for requesting permission to change the instruction image 31 to the external device 20 via the communication unit 16. When the communication unit 16 receives a permission signal for permitting the change of the instruction image 31 after transmission of the request signal, the CPU 11 may change the instruction image 31. This allow the instruction image 31 not to be changed against the intention of the remote instructor B who is the creator of the instruction image 31.

When changing the instruction image 31, the CPU 11 may transmit a notification of changing the instruction image 31 to the external device 20 via the communication unit 16. Thus, the remote instructor B who is the creator of the instruction image 31 is notified that the instruction image 31 is changed. In this case, a notification virtual image 32 that notifies the user A of the wearable terminal apparatus 10 that a notification is made to the remote instructor B of the external device 20 may be displayed on the display unit 14 as illustrated in FIG. 11. Note that the notification virtual image 32 may be a normal image in a non-virtual image format. The normal image is an image whose display position is not identified in the space and which is displayed at a predetermined position on the display surface of the display unit 14.

Figure 12:
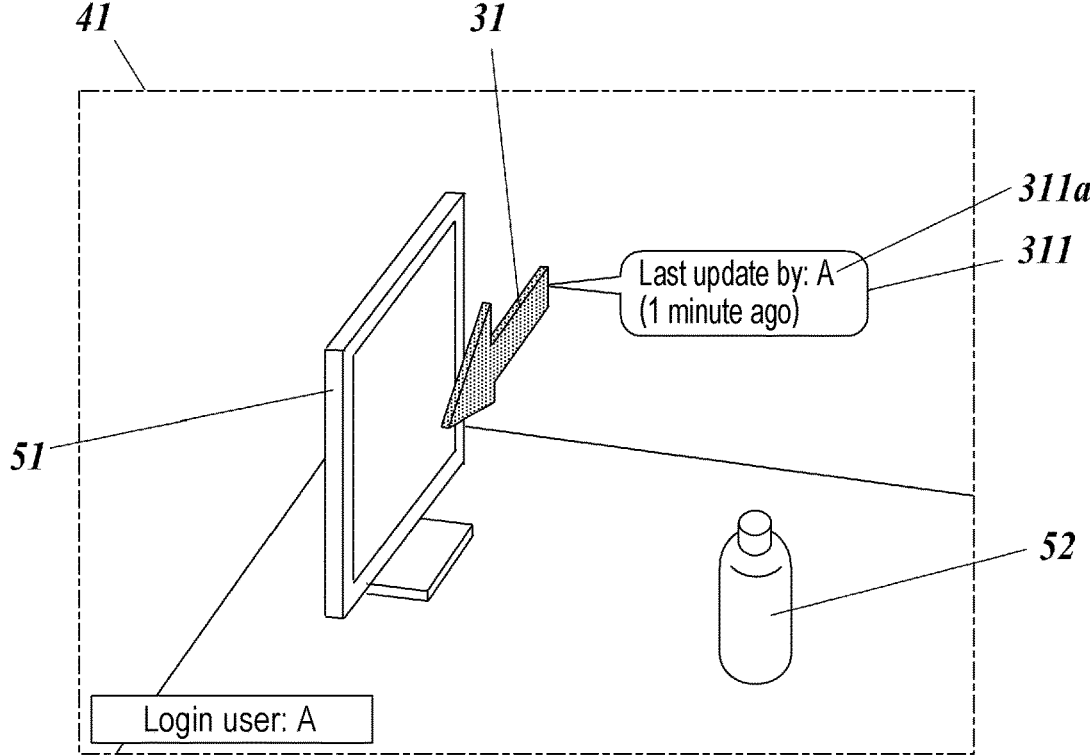
FIG. 12 is a diagram illustrating the visible region including the instruction image whose display position is changed.

As illustrated in FIG. 12, identification information 311a indicating the user (user A in this example) who has changed the display position of the instruction image 31 may be added to the instruction image 31. When the identification information 311a is added, an additional virtual image 311 which is an identification indicator including the identification information 311a may be displayed on the display unit 14. The additional virtual image 311 constitutes part of the instruction image 31. The additional virtual image 311 may further display information such as an elapsed time from the change of the display position. Addition of such an additional virtual image 311 (identification information 311a) is also one manner of the change of the instruction image 31. That is, the change of the instruction image 31 may include addition of the identification information 311a indicating a user who has performed a user operation on the instruction image 31, and the CPU 11 may cause the instruction image 31 including the identification information 311a to be displayed on the display unit 14. This thus allows the user of the wearable terminal apparatus 10 to easily determine the user who has changed the instruction image 31. Note that the identification information 311a and the additional virtual image 311 may be added to the instruction image 31 when any change is made on the instruction image 31 other than the change of the display position. Instead of additionally displaying the additional virtual image 311, the identification information 311a may be displayed in the body of the instruction image 31 (for example, inside of the arrow).

The CPU 11 may change the direction of the additional virtual image 311 to make a portion including the identification information 311a in the additional virtual image 311 face toward the wearable terminal apparatus 10 in response to the change of the position of the wearable terminal apparatus 10 in the space. This can make the additional virtual image 311 easily visually recognizable when the user A of the wearable terminal apparatus 10 moves in the space. The CPU 11 may change the display size of the additional virtual image 311 or the identification information 311a in response to the change of the position of the wearable terminal apparatus 10 in the space. In particular, the CPU 11 may change the display of the additional virtual image 311 or the identification information 311a to increase in size when the position of the wearable terminal apparatus 10 in the space moves to the position away from the additional virtual image 311. This can make the additional virtual image 311 easily visually recognizable when the user A of the wearable terminal apparatus 10 moves to the position away from the additional virtual image 311 in the space.

Figure 13:
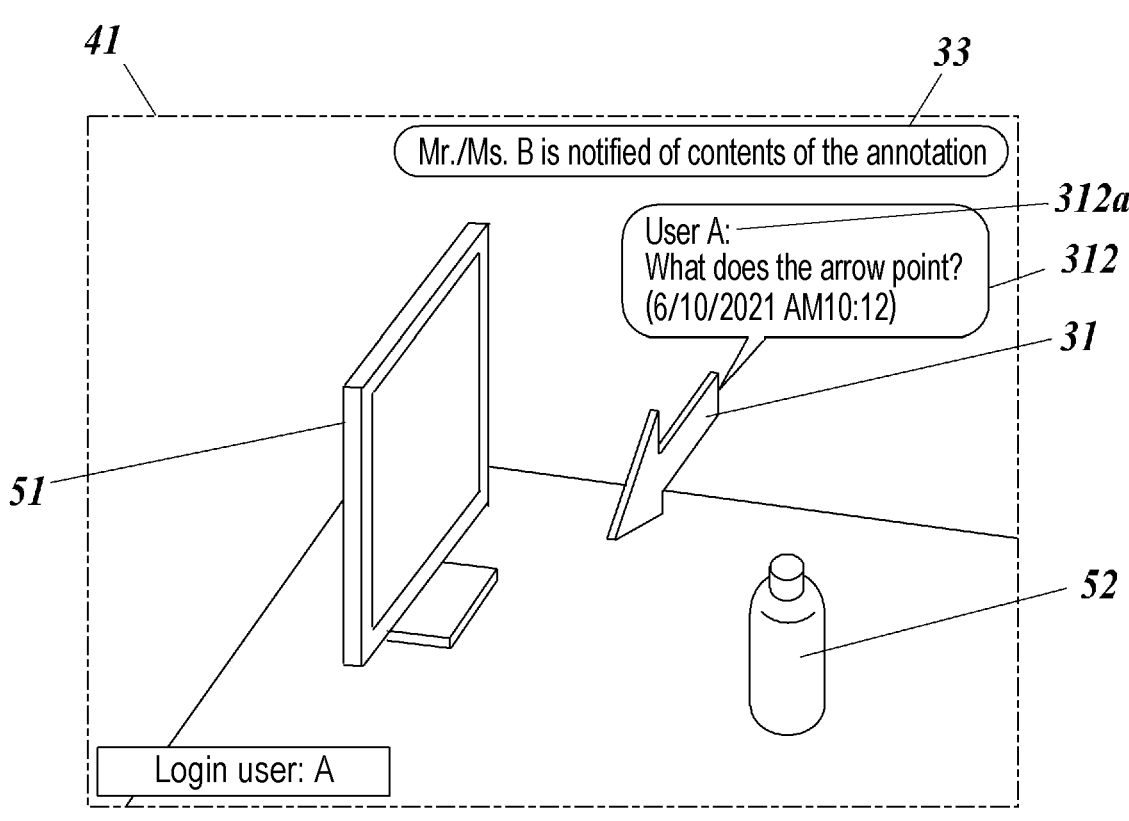
FIG. 13 is a diagram illustrating the visible region including the instruction image with an annotation.

The case of changing the display position of the instruction image 31 is described above as an example of the change of the instruction image 31. However, the change of the instruction image 31 is not limited to this. For example, as illustrated in FIG. 13, the change of the instruction image 31 may include addition of an annotation virtual image 312 which is an annotation for the instruction image 31. In this case, the CPU 11 causes the display unit 14 to display the instruction image 31 including the annotation virtual image 312. The annotation virtual image 312 constitutes part of the instruction image 31. This allows an annotation to be added to the instruction image 31. Thus, a comment can be recorded for a reminder for the user A or a message for another user.

The annotation virtual image 312 illustrated in FIG. 13 displays a comment of the user A, which is "What does the arrow point?" and an addition time of the annotation virtual image 312. The annotation virtual image 312 displays identification information 312a indicating the user (user A in this example) who has added the annotation virtual image 312. An operation to add the annotation virtual image 312 is not limited, but may be, for example, a method of selecting addition of an annotation from a menu screen (not illustrated) with the instruction image 31 being selected with the hand or the pointer 412 and inputting a comment using a software keyboard virtual image (not illustrated). In response to a user operation to add the annotation virtual image 312, the CPU 11 adds information of the annotation virtual image 312 to the instruction image data 1321 and updates the display of (re-displays) the instruction image 31 based on the instruction image data 1321 after the addition of the information. As in the additional virtual image 311 illustrated in FIG. 12, the direction of the annotation virtual image 312 may be changed such that a portion displaying the information in the annotation virtual image 312 faces toward the wearable terminal apparatus 10 in response to the change of the position of the wearable terminal apparatus 10 in the space.

When adding the annotation virtual image 312 which is an annotation to the instruction image 31, the CPU 11 may transmit annotation information including content of the annotation to the external device 20 via the communication unit 16. This allows the remote instructor B who is the creator of the instruction image 31 to be notified of the content of the annotation added to the instruction image 31. In this case, a notification virtual image 33 that notifies the user A of the wearable terminal apparatus 10 that a notification is made to the remote instructor B of the external device 20 may be displayed on the display unit 14 as illustrated in FIG. 13. Note that the notification virtual image 33 may be a normal image in a non-virtual image format. The annotation to the instruction image 31 may be added upon permission of the remote instructor B who operates the external device 20.

Figure 14:
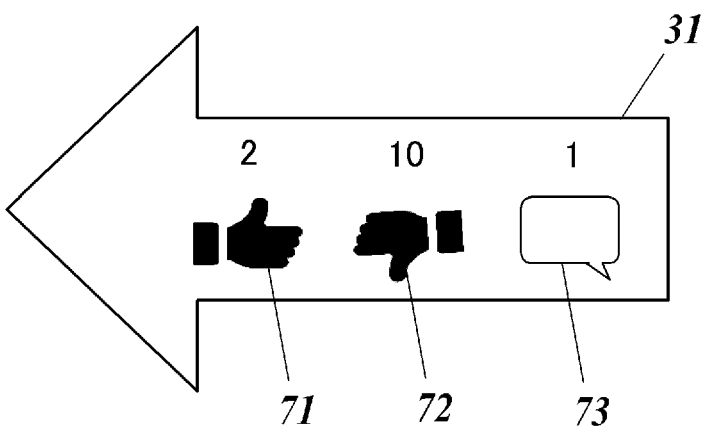
FIG. 14 is a diagram illustrating another example of the instruction image with an annotation.

A manner of adding the annotation to the instruction image 31 is not limited to the manner illustrated in FIG. 13. For example, as illustrated in FIG. 14, the annotation may be added inside the body of the arrow which is the instruction image 31. The instruction image 31 of FIG. 14 displays a like button 71, a dislike button 72, and a display comment button 73. The like button 71, the dislike button 72, and the display comment button 73, and numerical values displayed above these buttons are one manner of an annotation.

The like button 71 is selected when the user of the wearable terminal apparatus 10 makes a positive evaluation on the instruction image 31. The dislike button 72 is selected when the user of the wearable terminal apparatus 10 makes a negative evaluation on the instruction image 31. The like button 71 and the dislike button 72 can be operated multiple times at different timings by multiple different users who visually recognize the instruction image 31. In response to an operation of selecting the like button 71, the numerical value above the like button 71 is incremented. The number of users who have made a positive evaluation on the instruction image 31 can be determined from the numerical value. In response to an operation of selecting the dislike button 72, the numerical value above the dislike button 72 is incremented. The number of users who have made a negative evaluation on the instruction image 31 can be determined from the numerical value.

Figure 15:
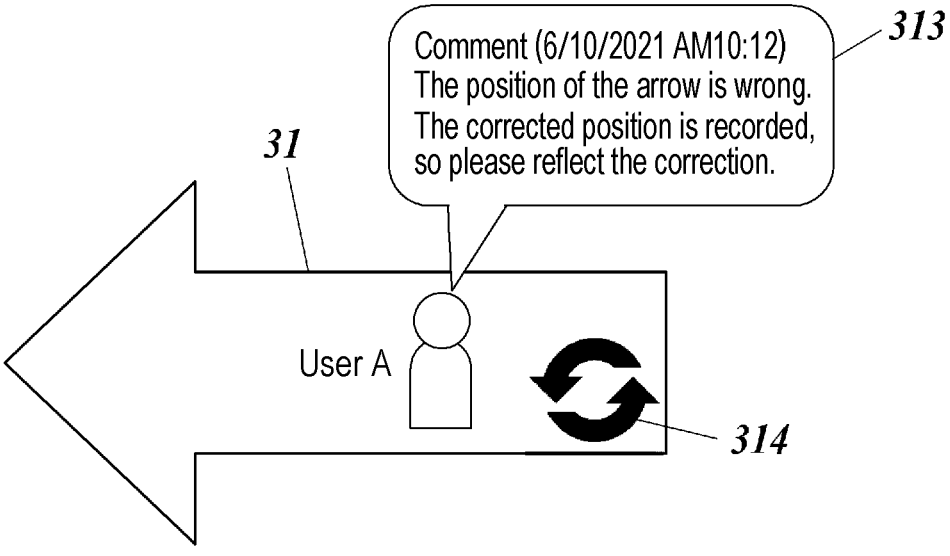
FIG. 15 is a diagram illustrating the instruction image when a comment is displayed.

The number of comments recorded on the instruction image 31 is presented above the display comment button 73. In response to an operation to select the display comment button 73, an annotation virtual image 313 including content of the recorded comment is displayed and the name of the user (user A in this case) who has recorded the comment is displayed in the instruction image 31 as illustrated in FIG. 15. The annotation virtual image 313 is a manner of an annotation. In FIG. 15, the annotation virtual image 313 displays a comment "The position of the arrow is wrong. The corrected position is recorded, so please reflect the correction." As described above, when the content of the comment is to request permission to change the instruction image 31 and the user who visually recognizes the annotation virtual image 313 has the authority to permit the change, a change reflection button 314 for reflecting the change of the instruction image 31 is also displayed in the instruction image 31. In response to an operation to select the change reflection button 314, the change of the instruction image 31 is reflected (in the example of FIG. 15, the display position of the instruction image 31 is changed).

Figure 16:
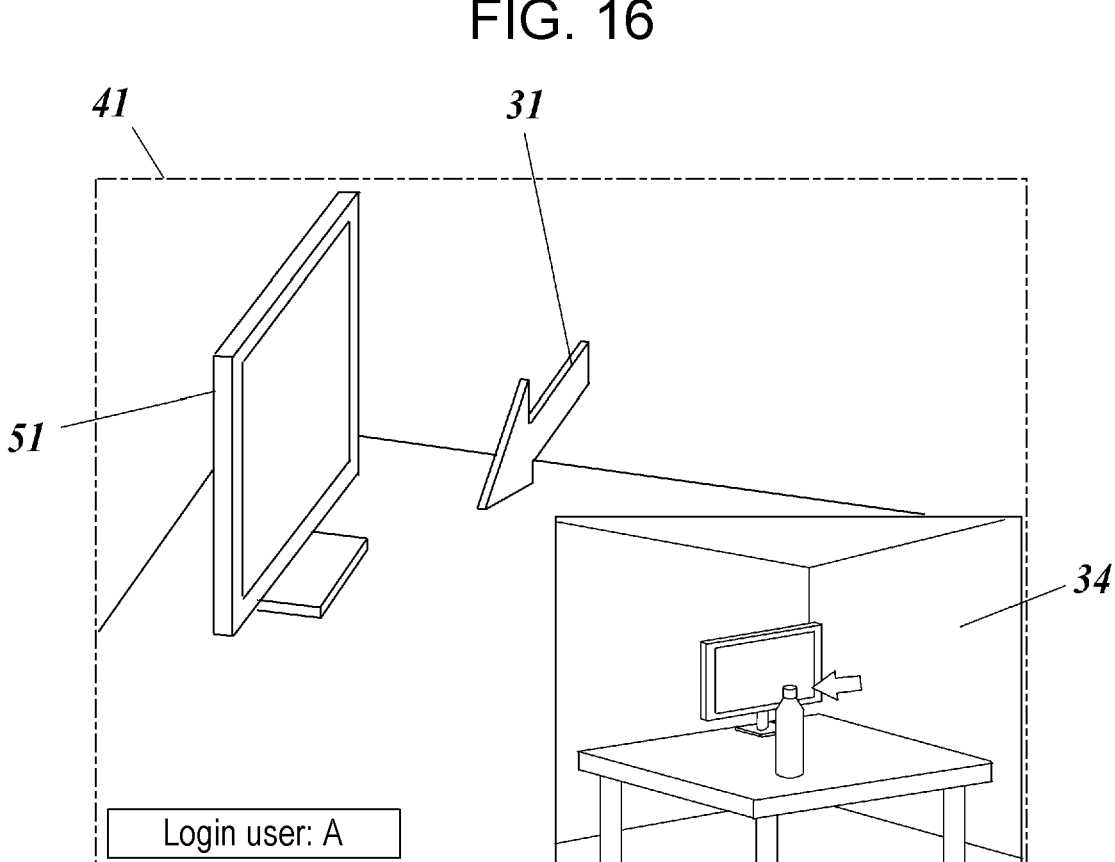
FIG. 16 is a diagram illustrating the visible region in which a capture image is displayed.

When the user A of the wearable terminal apparatus 10 visually recognizes the instruction image 31, the user A may desire to refer to a situation in which the instruction image 31 is displayed. Accordingly, in the wearable terminal apparatus 10 according to the present disclosure, the CPU 11 stores, in the storage unit 13, a capture image obtained when the instruction image 31 is displayed on the display unit 14 and including the instruction image 31 and the image obtained by the camera 154. In response to an instruction of the user or when a predetermined display condition of the capture image is satisfied, the CPU 11 causes the display unit 14 to display the capture image 34 as illustrated in FIG. 16. The capture image 34 corresponds to a recorded image of the visible region 41 of the user A when the instruction image 31 is displayed. Accordingly, with reference to the displayed capture image 34, the user A can easily determine the situation in which and the purpose for which the instruction image 31 is displayed. For example, as illustrated in FIG. 16, when the target pointed by the instruction image 31 of an arrow is unclear, the reference to the capture image 34 makes it easier to identify the target pointed by the arrow. Note that the capture image 34 may be a virtual image whose display position is determined in the space or may be a normal image in a non-virtual image format.

The predetermined display condition can be, but not limited to, the display position of the instruction image 31 being included in the visible region 41 of the user A, for example. In this case, the CPU 11 determines whether the display position of the instruction image 31 is included in the visible region 41 of the user A. If the CPU 11 determines that the display position of the instruction image 31 is included in the visible region 41 of the user A, the CPU 11 causes the display unit 14 to display the capture image 34. This allows the capture image 34 to be displayed at an appropriate timing without any operation of the user A.

The capture image may be recorded in the external device 20 and transmitted to the wearable terminal apparatus 10. That is, the CPU 11 may receive, via the communication unit 16, the capture image 34 that is an image in which the instruction image 31 is superimposed on the image displayed as the instructor screen 241 in the external device 20 in response to the generation instruction, and cause the display unit 14 to display the capture image 34. This allows a reference to be made to the capture image that facilitates understanding of the generation intention of the instruction image 31 by the remote instructor B of the external device 20.

A remote instruction process for displaying and changing the instruction image 31 as described above is described with reference to flowcharts of FIGS. 17 and 18. These flowcharts depict in parallel a control procedure performed by the CPU 11 in the remote instruction process in the wearable terminal apparatus 10 and a control procedure performed by the CPU 21 in the remote instruction process in the external device 20.

Figure 17:
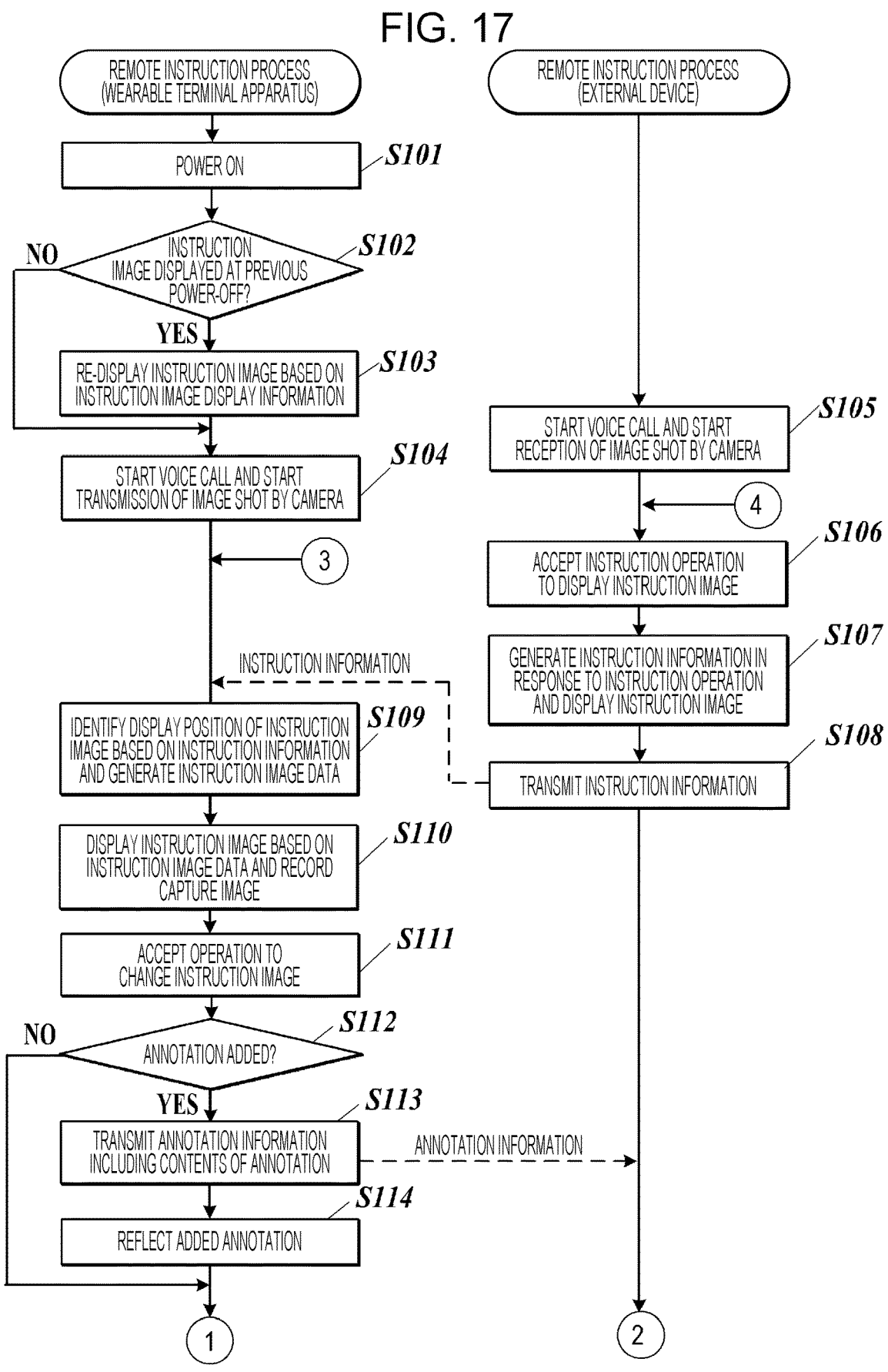
FIG. 17 is a flowchart illustrating a control procedure of a remote instruction process.
Figure 18:
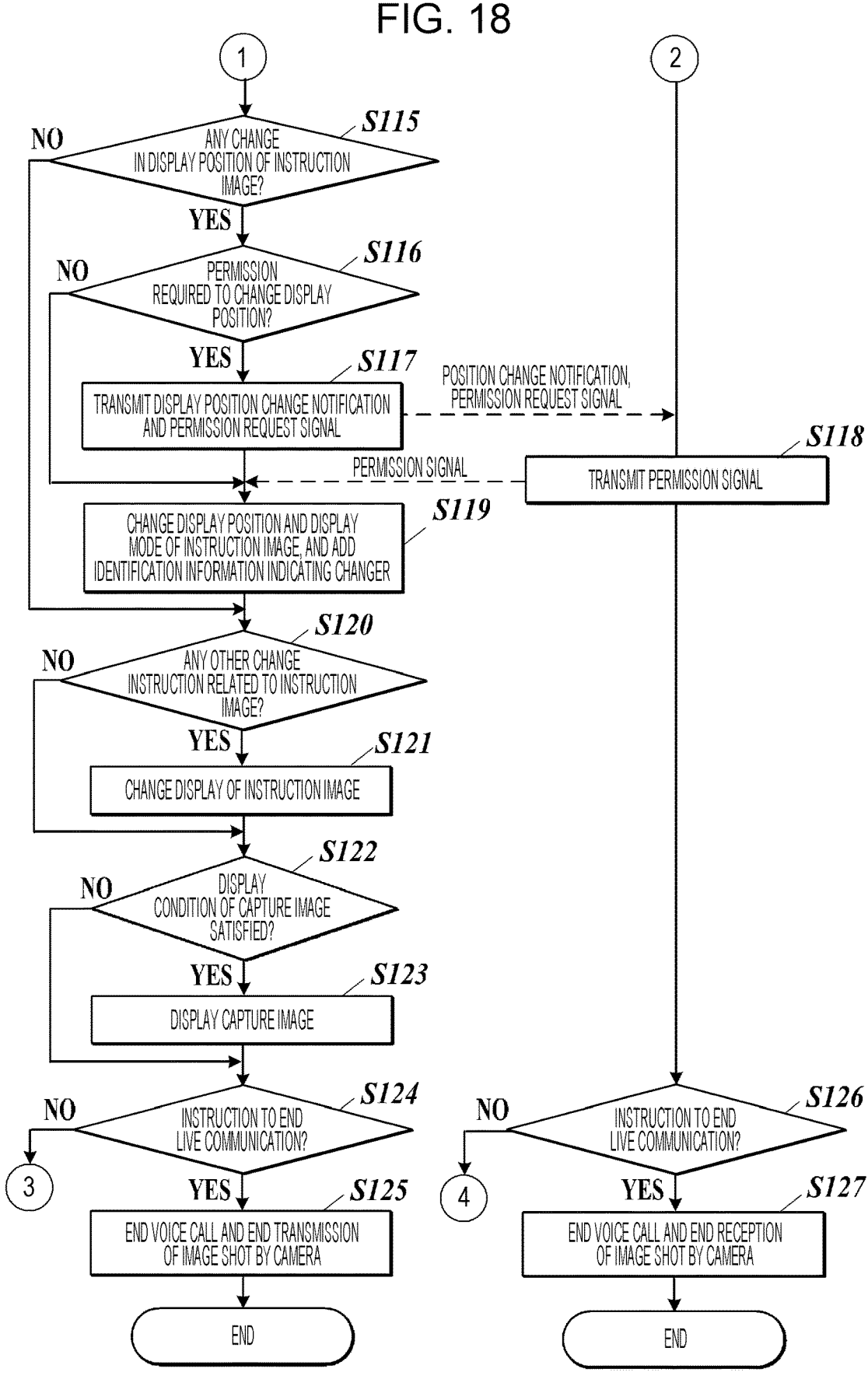
FIG. 18 is a flowchart illustrating the control procedure of the remote instruction process.

As illustrated in FIG. 17, in response to a power supply of the wearable terminal apparatus 10 is switched to an on state (step S101), the CPU 11 of the wearable terminal apparatus 10 determines whether the instruction image 31 is displayed at the previous power-off (step S102). In this case, the CPU 11 determines that the instruction image 31 is displayed when the virtual image data 132 in the storage unit 13 includes the instruction image data 1321. If the CPU 11 determines that the instruction image 31 is displayed at the previous power-off ("YES" in step S102), the CPU 11 causes the instruction image 31 to be re-displayed based on the instruction image data 1321 (step S103). As described above, when the power supply of the wearable terminal apparatus 10 enters the on state after entering an off state, the CPU 11 acquires the instruction image data 1321 of the instruction image 31 displayed on the display unit 14 before the power supply enters the off state and causes the instruction image 31 to be re-displayed based on the instruction image data 1321. This allows the necessary instruction image 31 to be referred to also after the power supply enters the off state.

In response to the end of step S103 or if the CPU 11 determines in step S102 that the instruction image 31 is not displayed at the previous power-off ("NO" in step S102), the CPU starts audio data communication with the external device 20 in response to an instruction of the user A to start a voice call (step S104). The CPU 11 also starts transmitting an image by the camera 154 to the external device 20 (step S104). In response to an instruction of the remote instructor B, the CPU 21 of the external device 20 starts audio data communication with the wearable terminal apparatus 10 to start a voice call (step S105). The CPU 21 starts receiving the image by the camera 154 of the wearable terminal apparatus 10 (step S105). Thus, live communication starts. Thereafter, the CPU 21 cause the instructor screen 241 to be displayed based on the image being received, and the image is displayed as a moving image in real time in the instructor screen 241.

The CPU 21 of the external device 20 accepts an instruction operation of the remote instructor B to generate and display the instruction image 31 (step S106). While accepting the instruction operation, the CPU 21 may pause the camera image in the instructor screen 241 and display a still image.

The CPU 21 generates the instruction information 133 in accordance with the content of the instruction operation, and causes the instruction image 31 to be displayed in the instructor screen 241 (step S107). The CPU 21 transmits the generated instruction information 133 to the wearable terminal apparatus 10 (step S108).

In response to receipt of the instruction information 133, the CPU 11 of the wearable terminal apparatus 10 identifies the display position of the instruction image 31 in the space based on the instruction information 133 and generates the instruction image data 1321 (step S109). The CPU 11 also causes the display unit 14 to display the instruction image 31 based on the instruction image data 1321 (step S110). The CPU 11 records the capture image when the instruction image 31 is displayed (that is, stores the capture image in the storage unit 13) (step S110).

The CPU 11 accepts a user operation to change the instruction image 31 (step S111). The CPU 11 determines whether a user operation to add an annotation to the instruction image 31 is performed (step S112). If the CPU 11 determines that the user operation is performed ("YES" in step S112), the CPU 11 transmits annotation information including the content of the annotation to the external device 20 (step S113) and causes the added annotation to be reflected on the instruction image 31 (step S114). That is, the CPU 11 adds the annotation information to the instruction image data 1321, and updates display of the instruction image 31 based on the instruction image data 1321 after the addition of the information.

In response to the end of the processing of step S114 or if the CPU 11 determines in step S112 that a user operation to add an annotation to the instruction image 31 is not performed ("NO" in step S112), the CPU 11 determines whether a user operation to change the display position of the instruction image 31 is performed (step S115). If the CPU 11 determines that the user operation is performed ("YES" in step S115), the CPU 11 determines whether a setting to require permission to change the display position of the instruction image 31 is made (step S116). If the CPU 11 determines that the setting to require permission is made ("YES" in step S116), the CPU 11 transmits a notification to change the display position of the instruction image 31 and a permission request signal for requesting permission to change the display position to the external device 20 (step S117).

Upon receipt of the permission request signal, the CPU 11 of the external device 20 transmits a permission signal to the wearable terminal apparatus 10 in response to a permission operation performed by the remote instructor B (step S118).

In response to receipt of the permission signal or if the CPU 11 of the wearable terminal apparatus 10 determines in step S116 that the setting to require permission to change the display position is not made ("NO" in step S116), the CPU 11 changes the display position and the display style (for example, the color) of the instruction image 31 and adds the additional virtual image 311 including the identification information 311$a$ indicating the user A who made the change to the instruction image 31 (step S119). That is, the CPU 11 changes the display position and the display style of the instruction image 31 in the instruction image data 1321 and adds the information of the additional virtual image 311, and then causes the instruction image 31 to be displayed based on the instruction image data 1321 after the change. Note that if the process branches to "NO" in step S116, the CPU 11 may transmit a notification to change the display position of the instruction image 31 to the external device 20.

In response to the end of step S119 or if the CPU 11 determines in step S115 that the user operation to change the display position of the instruction image 31 is not performed ("NO" in step S115), the CPU 11 determines whether a user operation to make another change related to the instruction image 31 is performed (step S120). The user operation accepted in step S120 may be, but not limited to, a user operation to change the display style (such as the color), the orientation, the size, and the type of the instruction image 31, for example. If the CPU 11 determines that the user operation is performed ("YES" in step S120), the CPU 11 changes display of the instruction image 31 in accordance with the user operation (step S121).

After the end of step S121 or if the CPU 11 determines in step S120 that the user operation to make another change related to the instruction image 31 is not performed ("NO" in step S120), the CPU 11 determines whether a capture image display condition is satisfied (step S123). When the display position of the instruction image 31 is included in the visible region 41 of the user A, the CPU 11 determines that the capture image display condition is satisfied. If the user determines that the capture image display condition is satisfied ("YES" in step S122), the CPU 11 causes the display unit 14 to display the capture image 34 (step S123). Note that in response to a user operation to display the capture image 34, step S123 may be performed.

In response to the end of step S123 or the CPU 11 determines in step S122 that the capture image display condition is not satisfied ("NO" in step S122), the CPU 11 determines whether an instruction to end the live communication is given by the user A (step S124). If the CPU 11 determines that the instruction is not given ("NO" in step S124), the process returns to step S109. If the CPU 11 determines that the instruction is given ("YES" in step S124), the CPU 11 ends the voice call and transmission of the image obtained by the camera 154 (step S125) and ends the remote instruction process.

In response to the end of step S118, the CPU 21 of the external device 20 determines an instruction to end the live communication is given by the remote instructor B (step S126). If the CPU 21 determines that the instruction is not given ("NO" in step S126), the process returns to step S106. If the CPU 21 determines that the instruction is given ("YES" in step S126), the CPU 21 ends the voice call and reception of the image obtained by the camera 154 (step S127) and ends the remote instruction process.

Second Embodiment

A configuration of a display system 1 according to a second embodiment is described. The second embodiment is different from the first embodiment in that an external information processing apparatus 80 performs part of the process performed by the CPU 11 of the wearable terminal apparatus 10 in the first embodiment. Differences from the first embodiment are described below, and description of common points is omitted.

Figures 19, 20:
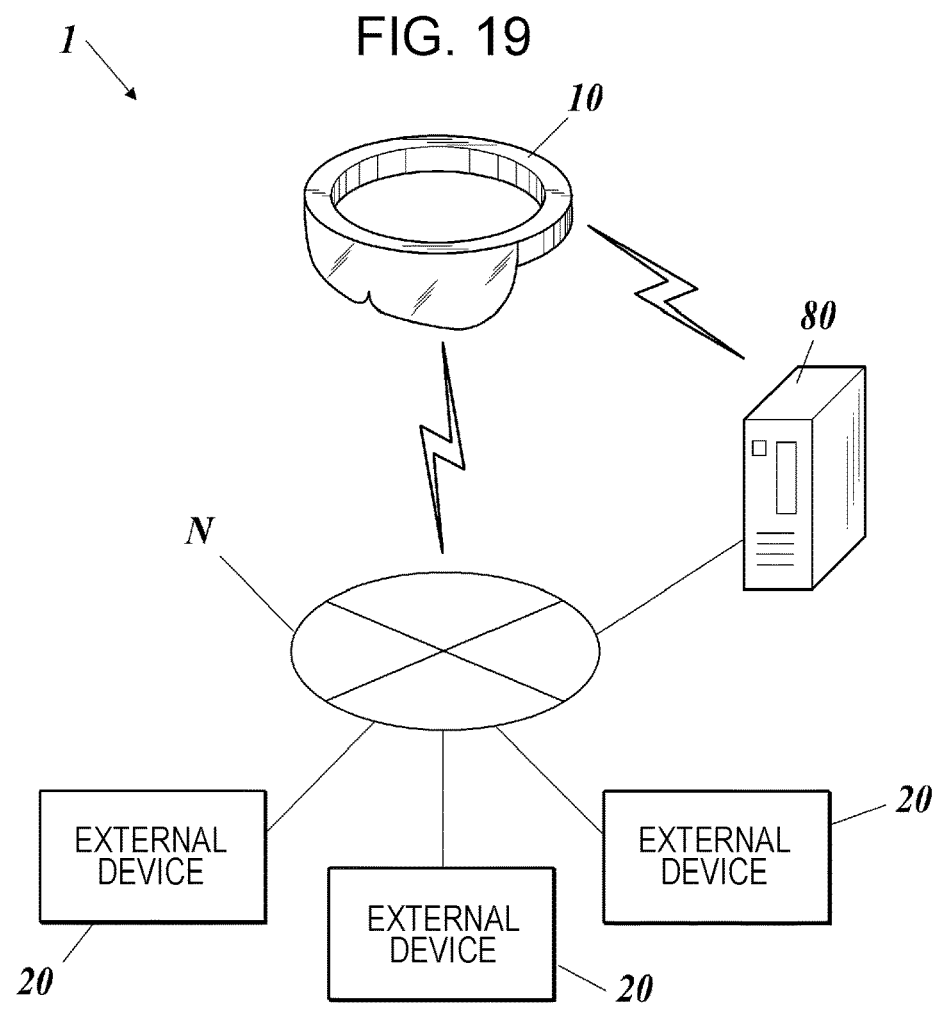
FIG. 19 is a schematic diagram illustrating a configuration of a display system according to a second embodiment.
FIG. 20 is a block diagram illustrating a major functional configuration of an information processing apparatus.

As illustrated in FIG. 19, the display system 1 includes the wearable terminal apparatus 10, the multiple external devices 20, and the information processing apparatus 80 (server) connected to the wearable terminal apparatus 10 and the network N by communication. At least part of the communication path between the wearable terminal apparatus 10 and the information processing apparatus 80 may be based on wireless communication. The hardware configuration of the wearable terminal apparatus 10 may be the same as and/or similar to that of the first embodiment, but the processor for performing the same process as the process performed by the information processing apparatus 80 may be omitted.

As illustrated in FIG. 20, the information processing apparatus 80 includes a CPU 81, a RAM 82, a storage unit 83, an operation display unit 84, and a communication unit 85. These components are connected to one another by a bus 86.

The CPU 81 is a processor that performs various kinds of arithmetic processing and integrally controls operations of the components of the information processing apparatus 80. The CPU 81 reads and executes a program 831 stored in the storage unit 83 to perform various control operations.

The RAM 82 provides a working memory space for the CPU 81 and stores temporary data.

The storage unit 83 is a non-transitory recording medium readable by the CPU 81 which is a computer. The storage unit 83 stores the program 831 to be executed by the CPU 81, various kinds of setting data, and so on. The program 831 is stored in the storage unit 83 in a form of a computer-readable program code. Examples of the storage unit 83 to be used include a nonvolatile storage device such as a solid state drive (SSD) including a flash memory or a hard disk drive (HDD).

The operation display unit 84 includes a display device such as a liquid crystal display and an input device such as a mouse and keyboard. The operation display unit 84 performs various displays such as an operation status and a processing result of the display system 1 on the display device. The operation status of the display system 1 may include an image obtained in real time by the camera 154 of the wearable terminal apparatus 10. The operation display unit 84 converts a user's input operation on the input device into an operation signal and outputs the operation signal to the CPU 81.

The communication unit 85 communicates with the wearable terminal apparatus 10 to transmit and receive data. For example, the communication unit 85 receives data including some or all of the detection results obtained by the sensor unit 15 of the wearable terminal apparatus 10, information related to a user operation (gesture) detected by the wearable terminal apparatus 10, and so on. The communication unit 85 may be capable of communicating with an apparatus other than the wearable terminal apparatus 10, for example, with the external device 20.

In the display system 1 thus configured, the CPU 81 of the information processing apparatus 80 performs at least part of the process performed by the CPU 11 of the wearable terminal apparatus 10 in the first embodiment. For example, the CPU 81 may perform three-dimensional mapping of the space 40, based on the detection result obtained by the depth sensor 153. The CPU 81 may detect the visible region 41 of the user in the space 40, based on the detection result obtained by each component of the sensor unit 15. The CPU 81 may generate the virtual image data 132 related to the virtual image 30 and the instruction image data 1321 related to the instruction image 31 in response to an operation of the user of the wearable terminal apparatus 10 or based on the instruction information received from the external device 20. The CPU 81 may detect the position and the orientation of the user's hand (and/or finger), based on images obtained by the depth sensor 153 and the camera 154.

The processing result obtained by the CPU 21 is transmitted to the wearable terminal apparatus 10 via the communication unit 25. The CPU 11 of the wearable terminal apparatus 10 operates each component (for example, the display unit 14) of the wearable terminal apparatus 10, based on the received processing result. The CPU 81 may transmit a control signal to the wearable terminal apparatus 10 to control the display on the display unit 14 of the wearable terminal apparatus 10 and/or control the output of the speaker 18.

In this way, the information processing apparatus 80 performs at least part of the process. This allows the apparatus configuration of the wearable terminal apparatus 10 to be simplified and can reduce the manufacturing cost. The use of the information processing apparatus 80 with higher performance can increase the speed and accuracy of various kinds of processing related to MR. Thus, the accuracy of the 3D mapping of the space 40, the display quality on the display unit 14, and the response speed of the display unit 14 relative to a user operation can be increased.

[Others]

The embodiments described above are merely an example and may be variously changed.

For example, in the embodiments described above, the visor 141 having a light-transmitting property is used to allow the user to visually recognize the real space. However, the configuration is not limited to this. For example, the visor 141 having a light-shielding property may be used to allow the user to visually recognize the image of the space 40 imaged by the camera 154. That is, the CPU 11 may cause the display unit 14 to display the image of the space 40 imaged by the camera 154 and the virtual image 30 superimposed on the image of the space 40. Such a configuration can also implement MR of merging the virtual image 30 with the real space.

The use of an image of the virtual space generated in advance instead of an image of the real space imaged by the camera 154 can implement VR that creates a sensation of being in the virtual space. In this VR, the visible region 41 of the user is identified, and a portion inside the visible region 41 in the virtual space and the virtual image 30 whose display position is determined to be inside the visible region 41 are displayed. Thus, as in the embodiments, a display operation of causing the instruction image 31 in different display styles for different instructors can be employed.

In the embodiments above, the example is described in which display of the instruction image 31 is changed in response to a user operation of the user A of the wearable terminal apparatus 10 while the wearable terminal apparatus 10 and the external device 20 are performing live communication. However, the configuration is not limited to this. For example, a change in the instruction image 31 by the user A may be not accepted in a live communication period in which communication is easily performed between the user A of the wearable terminal apparatus 10 and the remote instructor B of the external device 20, and the change in the instruction image 31 by the user A may be accepted when the live communication is not performed. That is, the CPU 11 does not change the instruction image 31 in a live communication period in which live communication is performed, and may change the instruction image 31 in a period other than the live communication period. This allows the user A of the wearable terminal apparatus 10 to add an annotation to record a memo or change the display position of the instruction image 31 to an appropriate position in a period in which communication with the remote instructor B via live communication is unavailable. Note that the CPU 11 may change the instruction image 31 in the wearable terminal apparatus 10 in the period other than the live communication period and may switch whether to permit a change in the instruction image 31 in the wearable terminal apparatus 10 in accordance with an instruction of the remote instructor B who operates the external device 20 in the live communication period.

The virtual image data 132 and the instruction image data 1321 may be stored in an external storage apparatus (for example, the information processing apparatus 80 in the second embodiment) provided outside the wearable terminal apparatus 10. In this case, the CPU 11 of the wearable terminal apparatus 10 acquires the virtual image data 132 from the external storage apparatus and displays the virtual image 30, and acquires the instruction image data 1321 from the external storage apparatus and displays the instruction image 31.

In the embodiments above, when a user operation of changing the instruction image 31 is performed in the wearable terminal apparatus 10, the instruction image data 1321 is changed in response to the user operation and display of the instruction image 31 is updated based on the instruction image data 1321 after the change. However, the configuration is not limited to this. For example, the instruction information 133 received from the external device 20 may be changed in response to the user operation. Then, the instruction image data 1321 may be generated again based on the instruction information 133 after the change, and the instruction image 31 may be displayed based on the instruction image data 1321.

When the instruction information 133 received from the external device 20 includes information equivalent to the instruction image data 1321 in the embodiments above, generation of the instruction image data 1321 may be omitted and the instruction image 31 may be displayed based on the instruction information 133. In this case, in response to a user operation to change the instruction image 31 in the wearable terminal apparatus 10, the content of the instruction information 133 is changed in accordance with content of the user operation and display of the instruction image 31 is updated based on the instruction information 133 after the change.

When the instruction image 31 is changed multiple times by one or more users, each time the instruction image 31 is changed, different instruction image data 1321 may be generated and stored in the storage unit 13. This allows the instruction image 31 of multiple versions including the version immediately after each change to be left as a change history. The instruction image 31 is displayed based on the instruction image data 1321 corresponding to a desired version, so that the instruction image 31 of the desired version can be displayed. The instruction image data 1321 corresponding to the instruction image 31 before the first change is left, so that the original instruction image 31 before the change can be displayed.

The wearable terminal apparatus 10 is not limited to the apparatus having the annular body 10a illustrated in FIG. 1, and may have any structure that has a display unit visually recognizable by the user when the user wears the apparatus. For example, the wearable terminal apparatus 10 may be configured to cover the entire head such as a helmet. The wearable terminal apparatus 10 may have a frame placed on ears such as glasses, and the frame may include various devices built therein.

The virtual image 30 is not necessarily stationary in the space 40, and may move inside the space 40 along a predetermined trajectory.

An example has been described in which a gesture of a user is detected and accepted as an input operation. However, the configuration is not limited to this. For example, the input operation may be accepted using a controller held by the user in hand or worn by the user on the body for use.

The description is given using an example in which an instruction to display the instruction image 31 is given from the external device 20 to the wearable terminal apparatus 10 during a voice call based on audio data communication. However, the configuration is not limited to this, and the instruction to display the instruction image 31 may be performed without audio data communication.

An example has been described in which a voice call is performed between the wearable terminal apparatus 10 and the external device 20. However, the call is not to this and a video call may be performed. In this case, the external device 20 may be provided with a web camera for imaging the remote operator, and image data obtained by the web camera may be transmitted to the wearable terminal apparatus 10 and displayed on the display unit 14.

The instruction image 31 is not limited to an image to be displayed to give a work instruction to the user of the wearable terminal apparatus 10. The instruction image 31 includes any virtual image 30 to be displayed in the wearable terminal apparatus 10 based on an instruction of an instructor (including the user) to be visually recognized by the user of the wearable terminal apparatus 10.

In addition, specific details of the configuration and control described in the embodiments above can be appropriately changed within the scope not departing from the gist of the present disclosure. The configuration and control described in the embodiments above can be combined as appropriate within the scope not departing from the gist of the present disclosure.

INDUSTRIAL APPLICABILITY

The present disclosure can be used for a wearable terminal apparatus, a program, and a display method.

REFERENCE SIGNS

1 display system
10 wearable terminal apparatus
10a body
11 CPU (processor)
12 RAM
13 storage unit
131 program
132 virtual image data
1321 instruction image data (instruction image information)
133 instruction information
14 display unit
141 visor (display member)
142 laser scanner
15 sensor unit 151 acceleration sensor
152 angular velocity sensor
153 depth sensor
154 camera
155 eye tracker
16 communication unit
17 microphone
18 speaker
19 bus
20 external device
21 CPU
23 storage unit
231 program
24 operation display unit
241 instructor screen
30 virtual image
31 instruction image
311 additional virtual image
311a, 312a identification information
312 annotation virtual image
313 annotation virtual image
314 change reflection button
32, 33 notification virtual image
34 capture image
40 space
41 visible region
411 virtual line
412 pointer
51 monitor
52 bottle
61 setting panel
62 arrow icon
63 pen input icon
64 image icon
71 like button
72 dislike button
73 display comment button
80 information processing apparatus
81 CPU
83 storage unit
831 program
A user
B remote instructor
N network

The invention claimed is:

1. A wearable terminal apparatus to be worn by a user for use, comprising:
a display unit;
at least one circuitry;
a camera configured to image a space as a visible region of the user; and
a communication unit configured to perform data communication with an external device to be used by a remote instructor,
wherein the at least one circuitry is configured to:
transmit an image obtained by the camera to the external device via the communication unit;
receive instruction information related to an instruction to generate an instruction image via the communication unit, based on a captured image of the space captured by the camera that is displayed on the external device;
cause the display unit to display the instruction image in the space, the instruction image being displayed at a position in the space based on the received instruction information;

determine that the position in the space is within a visible region of the user;
cause the display unit to display the instruction image in the space and the captured image of the space displayed on the external device in which the instruction image is superimposed at the position in the space at a timing when the instruction is generated by the external device, in response to determining that the position in the space is within the visible region of the user; and
accept a user operation to change the displayed instruction image and update display of the instruction image in accordance with the user operation.

2. The wearable terminal apparatus according to claim 1, wherein
the display unit includes a display member having a light-transmitting property, and
the at least one circuitry is configured to cause the instruction image to be displayed on a display surface of the display member, the instruction image being visually recognized in the space that is visually recognized through the display member.

3. The wearable terminal apparatus according to claim 1, wherein the at least one circuitry is configured to cause the display unit to display an image of the space imaged by the camera and the instruction image superimposed on the image of the space.

4. The wearable terminal apparatus according to claim 1, wherein
a change of the instruction image includes addition of an annotation to the instruction image, and
the at least one circuitry is configured to cause the display unit to display the instruction image including the annotation.

5. The wearable terminal apparatus according to claim 4, wherein the at least one circuitry is configured to transmit annotation information including content of the annotation to the external device via the communication unit when the annotation is added to the instruction image.

6. The wearable terminal apparatus according to claim 1, wherein a change of the instruction image includes a change of a display position of the instruction image.

7. The wearable terminal apparatus according to claim 6, wherein the at least one circuitry is configured to cause at least one of the instruction image that is being moved to a changed display position in response to the change of the display position or the instruction image for which the change of the display position is completed in a display style different from a display style of the instruction image before the change of the display position.

8. The wearable terminal apparatus according to claim 1, wherein
a change of the instruction image includes addition of identification information indicating the user who has performed the user operation on the instruction image, and
the at least one circuitry is configured to cause the display unit to display the instruction image including the identification information.

9. The wearable terminal apparatus according to claim 8, wherein the at least one circuitry is configured to:
cause the display unit to display a virtual image including the identification information when the identification information is added; and
change a direction of the virtual image in response to a change of a position of the wearable terminal apparatus in the space to make a portion including the identification information in the virtual image face toward the wearable terminal apparatus.

10. The wearable terminal apparatus according to claim 1, wherein a change of the instruction image includes a change of a color of the instruction image.

11. The wearable terminal apparatus according to claim 1, wherein the at least one circuitry is configured to:

transmit a request signal for requesting permission to change the instruction image to the external device via the communication unit in response to the user operation to change the instruction image, and change the instruction image in response to reception of a permission signal for permitting the change of the instruction image by the communication unit after the transmission of the request signal.

12. The wearable terminal apparatus according to claim 1, wherein the at least one circuitry is configured to transmit a notification on a change of the instruction image to the external device via the communication unit when the instruction image is changed.

13. The wearable terminal apparatus according to claim 1, wherein the communication unit is configured to perform live communication including at least one of real-time audio data communication with the external device or real-time transmission of the image to the external device, and the at least one circuitry is configured to keep the instruction image unchanged in a live communication period in which the live communication is performed and change the instruction image in a period other than the live communication period.

14. The wearable terminal apparatus according to claim 1, wherein the at least one circuitry is configured to store, in a storage unit, the captured image when the instruction image is displayed on the display unit.

15. The wearable terminal apparatus according to claim 1, wherein the at least one circuitry is configured to receive, via the communication unit, the captured image when the instruction image is superimposed on the image of the space displayed in the external device in accordance with the instruction.

16. The wearable terminal apparatus according to claim 1, wherein the at least one circuitry is configured to:

when a power supply of the wearable terminal apparatus enters an off state and then enters an on state, acquire the instruction information related to the instruction image displayed on the display unit before the power supply enters the off state or instruction image information generated based on the instruction information; and cause the instruction image to be re-displayed based on the instruction information or the instruction image information.

17. A display method to be executed by a computer provided in a wearable terminal apparatus to be worn by a user for use, the wearable terminal apparatus including a camera to image a space as a visible region of the user and a communication unit to perform data communication with an external device to be used by a remote instructor, the display method comprising:

transmitting an image obtained by the camera to the external device via the communication unit;

receiving instruction information related to an instruction to generate an instruction image via the communication unit, based on a captured image of the space captured by the camera that is displayed on the external device;

causing a display unit to display the instruction image in the space, the instruction image being displayed at a position in the space based on the received instruction information;

determining that the position in the space is within a visible region of the user;

causing the display unit to display the instruction image in the space and the captured image of the space displayed on the external device in which the instruction image is superimposed at the position in the space at a timing when the instruction is generated by the external device, in response to determining that the position in the space is within the visible region of the user; and accepting a user operation to change the displayed instruction image and updating display of the instruction image in accordance with the user operation.

18. A wearable terminal apparatus to be worn by a user for use, comprising:

at least one processor;

a camera configured to image a space as a visible region of the user; and a communication unit configured to perform data communication with an external device to be used by a remote instructor, wherein the at least one processor is configured to:

transmit an image obtained by the camera to the external device via the communication unit;

receive instruction information related to an instruction to generate an instruction image via the communication unit, based on the image of the space captured by the camera that is displayed on the external device;

cause a display unit to display the instruction image, the instruction image being visually recognized at a position based on the received instruction information in the space; and accept a user operation to change the displayed instruction image and update display of the instruction image in accordance with the user operation, wherein a change of the instruction image includes addition of information on the instruction image, and wherein the at least one processor is configured to:

cause the display unit to display a virtual image including the information when the information is added; and change a direction of the virtual image with a position of the virtual image in the space fixed in response to a change of a position of the wearable terminal apparatus in the space to make a portion including the information in the virtual image face toward the wearable terminal apparatus.

* * * * *